United States Patent
Muquit

(10) Patent No.: US 8,447,080 B2
(45) Date of Patent: May 21, 2013

(54) SURFACE EXTRACTION METHOD, SURFACE EXTRACTION DEVICE, AND PROGRAM

(75) Inventor: Mohammad Abdul Muquit, Kanagawa (JP)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 12/532,479

(22) PCT Filed: Mar. 27, 2008

(86) PCT No.: PCT/JP2008/056647
§ 371 (c)(1),
(2), (4) Date: Sep. 22, 2009

(87) PCT Pub. No.: WO2008/117894
PCT Pub. Date: Oct. 2, 2008

(65) Prior Publication Data
US 2010/0054608 A1    Mar. 4, 2010

(30) Foreign Application Priority Data
Mar. 28, 2007    (JP) ................................. 2007-085073

(51) Int. Cl.
*G06K 9/00*    (2006.01)
(52) U.S. Cl.
USPC ............................ 382/128; 382/154; 382/224
(58) Field of Classification Search
USPC .................................................... 382/124
See application file for complete search history.

(56) References Cited

U.S. PATENT DOCUMENTS

| | | | | |
|---|---|---|---|---|
| 4,835,688 A * | 5/1989 | Kimura | ........................ | 345/424 |
| 5,633,951 A * | 5/1997 | Moshfeghi | .................... | 382/154 |
| 5,969,524 A * | 10/1999 | Pierpaoli et al. | .............. | 324/307 |
| 7,487,063 B2 * | 2/2009 | Tubic et al. | .................... | 702/152 |
| 7,529,402 B2 * | 5/2009 | Ishii | .............................. | 382/154 |
| 8,005,274 B2 * | 8/2011 | Guhring et al. | ............... | 382/123 |
| 2002/0015517 A1 * | 2/2002 | Hwang et al. | ................. | 382/131 |
| 2005/0107958 A1 * | 5/2005 | Park et al. | ....................... | 702/19 |
| 2005/0110791 A1 * | 5/2005 | Krishnamoorthy et al. | .. | 345/419 |
| 2006/0062457 A1 * | 3/2006 | Grady | ........................... | 382/173 |
| 2006/0104519 A1 * | 5/2006 | Stoeckel et al. | ............... | 382/224 |
| 2008/0260227 A1 * | 10/2008 | Hayashi et al. | ............... | 382/131 |

FOREIGN PATENT DOCUMENTS

| | | |
|---|---|---|
| JP | 10-507954 | 8/1998 |
| JP | 2002-175529 | 6/2002 |
| JP | 2006-55631 | 3/2006 |

\* cited by examiner

*Primary Examiner* — Hadi Akhavannik
(74) *Attorney, Agent, or Firm* — Finnegan, Henderson, Farabow, Garrett & Dunner, LLP

(57) ABSTRACT

A surface extraction method capable of improving accuracy of extraction of surfaces of an object, a surface extraction device, and a program are proposed. A voxel space that is divided into voxels having a lattice shape, and whether or not object constituting voxels that constitute an object which is shown in the voxel space is investigated in units of voxel rows of the voxels. Ends of the continuous object constituting voxels in the voxel rows are extracted as surfaces of the object. Straight-line rows are used as units, and intermediate portions of continuous constituting regions in the straight-line rows are ignored. Thus, even when a region that does not constitute the object exists inside the object, the region that does not constitute the object can be prevented from being falsely extracted as a surface of the object without investigation of the same region two times or more.

22 Claims, 28 Drawing Sheets

(A)

(B)

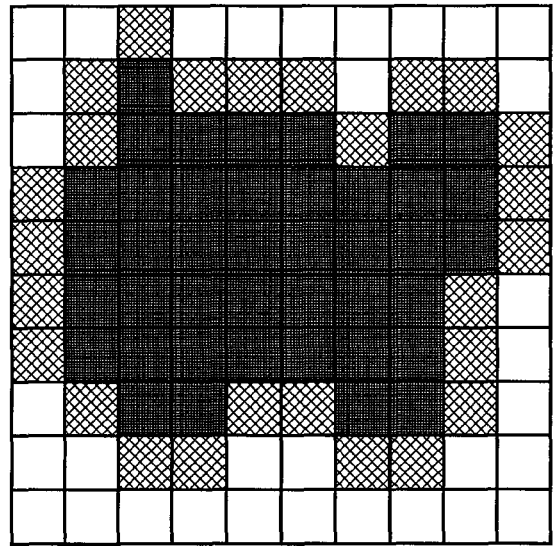
(B)
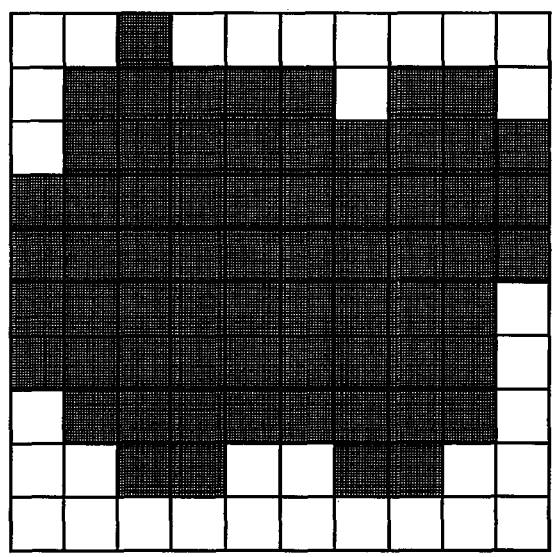
(A)
FIG. 1

FIG. 2
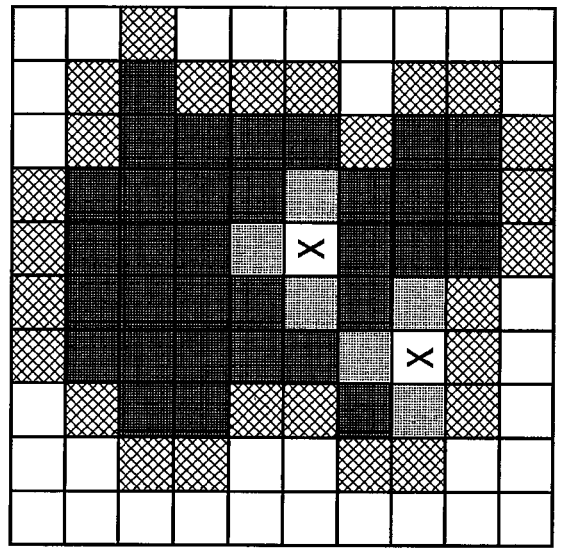
(B)
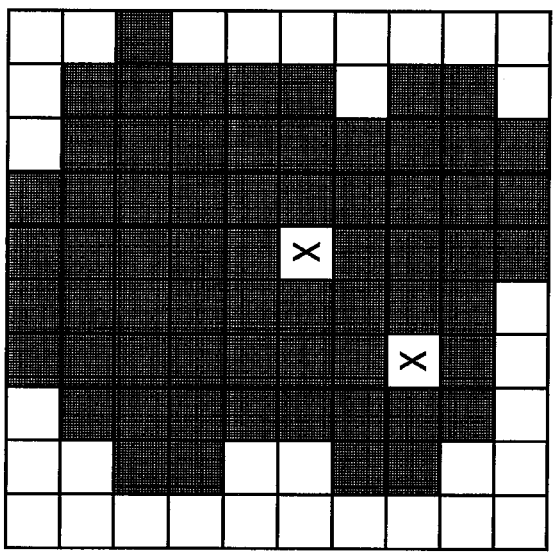
(A)

FIG. 7
(A) 
(B) 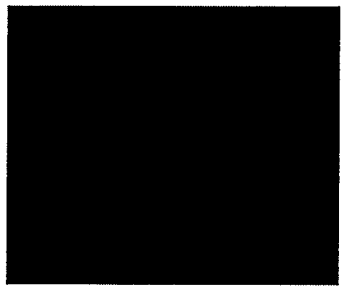
(C) 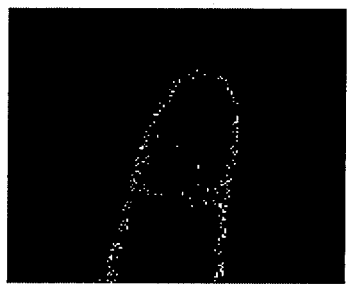
(D) 
(E) 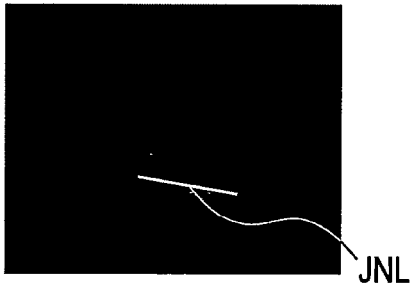

FIG. 9

(A)          (B)

SURFACE EXTRACTION METHOD, SURFACE EXTRACTION DEVICE, AND PROGRAM

TECHNICAL FIELD

The present invention relates to a surface extraction method, a surface extraction device, and a program, which are suitable to be applied to, for example, biometrics authentication.

BACKGROUND ART

Biometrics authentication refers to methods for identifying a person using an identification target of the living body of the person. Blood vessels of a finger are one identification target of a living body.

For example, an authentication apparatus that generates a three-dimensional image by combining images of different surfaces of a fingertip and that uses this as an identification target has been proposed (for example, see Patent Document 1).

Patent Document 1: Japanese Unexamined Patent Application Publication No. 2002-175529

Meanwhile, a method called a view-volume intersection method (Shape From Silhouette method) exists as one method for generating a three-dimensional volume of an object. In the view-volume intersection method, in accordance with images of an object that were picked up from multiple viewpoints, information concerning a position of a camera, and so forth, when projection from positions of the viewpoints, from which the images were picked up, into a three-dimensional space, which is divided into voxels as units, is performed for the object that is shown in the images, voxels of common portions of projected regions that are projected in the three-dimensional space are obtained as a three-dimensional volume.

There is a case in which surfaces of such a three-dimensional volume are extracted as one of parameters representing the shape of the object or as information that is used to obtain the parameter. As an extraction method in this case, typically, the following method is provided: each of voxels of a three-dimensional volume is considered as a consideration target; and when, among voxels that are in contact with the voxel which is a consideration target, even one voxel that does not constitute the three-dimensional volume exists, the voxel that is a consideration target is extracted as a voxel of a surface of the three-dimensional volume.

Accordingly, for example, as illustrated in FIG. 1, regarding voxels (voxels shaded with diagonal lines in the figure) that correspond to boundaries between voxels of a three-dimensional volume and voxels other than those of the three-dimensional volume (white voxels in the figure), when the voxels are considered as consideration targets, one or more voxels that do not constitute the three-dimensional volume exist. Thus, the voxels are extracted as voxels of surfaces of the three-dimensional volume. Note that, for the sake of convenience, FIG. 1 illustrates a certain cross section of a certain three-dimensional volume.

However, in the extraction method, because of noise or the like, for example, as illustrated in FIG. 2, when a three-dimensional volume having voxels X, which do not constitute the three-dimensional volume, as portions of the inside of the three-dimensional volume is structured, voxels around the voxels X are falsely detected as voxels of surfaces of the three-dimensional volume (the voxels that are falsely detected being illustrated by being shaded with dots in the figure). As a result, there is a problem that extraction accuracy is reduced. Note that, for the sake of convenience, FIG. 2 illustrates a certain cross section of the three-dimensional volume as in the case of FIG. 1.

DISCLOSURE OF INVENTION

The present invention is made in view of the above-mentioned points, and is made to propose a surface extraction method capable of improving accuracy of extraction of surfaces of an object, a surface extraction device, and a program.

In order to solve the above-mentioned issues, the present invention provides a surface extraction method, and the surface extraction method includes a first step of investigating, in a three-dimensional space that is divided into regions having a lattice shape, in units of straight-line rows of the regions, whether or not constituting regions that constitute an object which is shown in the three-dimensional space exist; and a second step of extracting, as surfaces of the object, the constituting regions that exist at ends of a straight-line row.

Furthermore, the present invention provides a surface extraction device, and the surface extraction device includes a work memory and an image processing section that performs image processing with the work memory. The image processing section investigates, in a three-dimensional space that is divided into regions having a lattice shape, in units of straight-line rows of the regions, whether or not constituting regions that constitute an object which is shown in the three-dimensional space exist, and extracts as surfaces of the object, the constituting regions that exist at ends of a straight-line row.

Moreover, the present invention provides a program, and the program causes a control section that controls a work memory to perform investigating, in a three-dimensional space that is divided into regions having a lattice shape, in units of straight-line rows of the regions, whether or not constituting regions that constitute an object which is shown in the three-dimensional space exist; and extracting, as surfaces of the object, the constituting regions that exist at ends of a straight-line row.

According to the present invention, the straight-line rows are used as units, intermediate regions that exist in places other than at ends of the straight-line rows are ignored. Thus, even when a region that does not constitute the object exists inside the object, the region that does not constitute the object can be prevented from being falsely extracted as a surface of the object without investigation of the same region two times or more. Therefore, the surface extraction method capable of improving accuracy of extraction of surfaces of an object, the surface extraction device, and the program can be realized.

BRIEF DESCRIPTION OF DRAWINGS

FIG. 1 includes schematic diagrams illustrating states (1) (A) before voxels constituting surfaces on a cross section of a three-dimensional volume are extracted and (B) after the voxels are extracted.

FIG. 2 includes schematic diagrams illustrating states (2) (A) before voxels constituting surfaces on a cross section of a three-dimensional volume are extracted and (B) after the voxels are extracted.

FIG. 7 includes schematic diagrams for explaining detection of a finger joint.

FIG. 9 includes schematic diagrams illustrating blood vessel images before and after embossing is performed.

FIG. 25 includes schematic diagrams for explaining extraction of end voxels, which illustrate (A) voxel rows in the length direction, (B) voxel rows in the width direction, and (C) OR.

FIG. 28 includes schematic diagrams for explaining extraction of end voxels in another embodiment, which illustrate (A) diagonal voxel rows 1, (B) diagonal voxel rows 2, and (C) OR.

BEST MODE FOR CARRYING OUT THE INVENTION

Hereinafter, an embodiment to which the present invention is applied will be described in detail.

Figure 3:
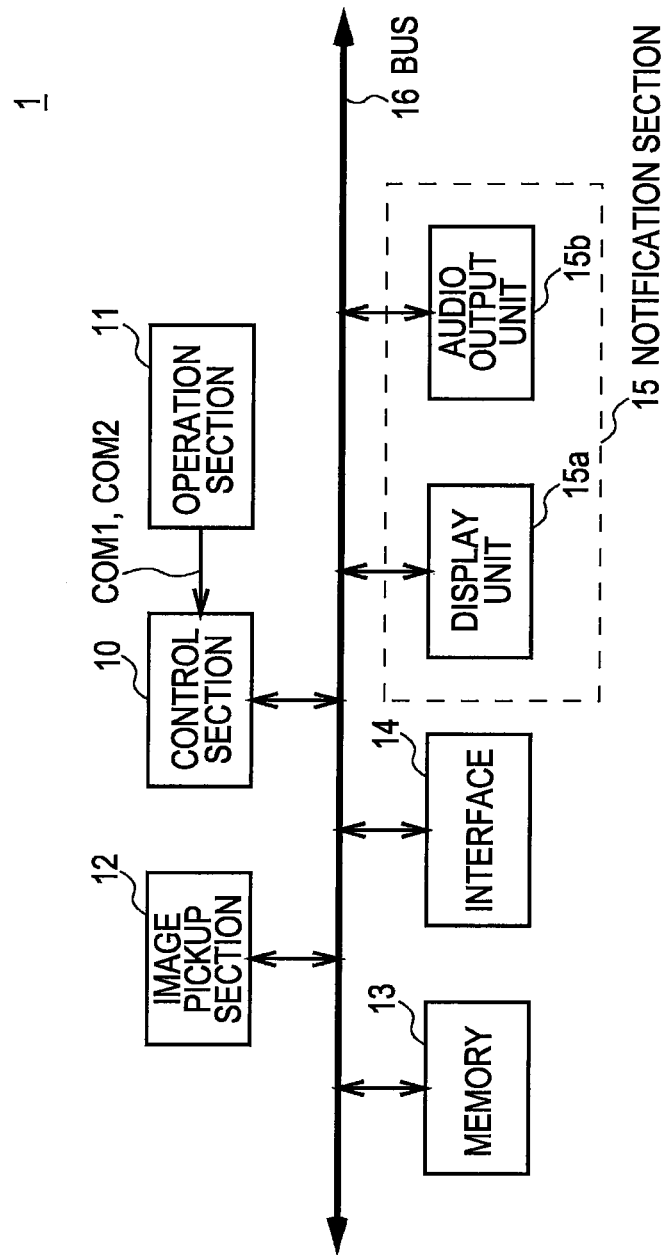
FIG. 3 is a block diagram illustrating a configuration of an authentication apparatus according to a present embodiment.

(1) Overall Configuration of Authentication Apparatus According to Present Embodiment In FIG. 3, an overall configuration of an authentication apparatus 1 according to a present embodiment is illustrated. The authentication apparatus 1 is configured by connecting each of an operation section 11, an image pickup section 12, a memory 13, an interface 14, and a notification section 15 to a control section 10 via a bus 16.

The control section 10 is configured as a computer including a CPU (Central Processing Unit) that exercises overall control of the authentication apparatus 1, a ROM (Read Only Memory) in which various programs, setting information, and so forth are stored, and a RAM (Random Access Memory) serving as a work memory for the CPU.

To the control section 10, an execution command COM1 for a mode in which blood vessels of a user that is a register target (hereinafter, this will be referred to as a registrant) are to be registered (hereinafter, this will be referred to as a blood vessel registration mode) or an execution command COM2 for a mode in which whether a person is identified as a registrant (hereinafter, this will be referred to as an authentication mode) is input from the operation section 11 in accordance with a user operation.

The control section 10 is configured to determine, in accordance with the above-mentioned execution command COM1 or COM2, a mode to be executed, and configured to, in accordance with a program corresponding to a determination result, appropriately control the image pickup section 12, the memory 13, the interface 14, and the notification section 15, thereby executing the blood vessel registration mode or the authentication mode.

The image pickup section 12 adjusts the position of a lens in an optical system, the aperture value of an aperture, and the shutter speed (exposure time) of an image pickup element in accordance with an exposure value (EV) that is specified by the control section 10.

Furthermore, the image pickup section 12 picks up images of a photographic subject that are projected on an image pickup face of the image pickup element at predetermined intervals, and sequentially outputs data items concerning the images that are generated as image pickup results (hereinafter, these will be referred to as image data items) to the control section 10.

Additionally, the image pickup section 12 drives a near-infrared light source in a period that is specified by the control section 10, and irradiates a space that is an image pickup target (hereinafter, this will be referred to as an image pickup space) with near-infrared light that is specifically absorbed in blood vessels.

When a finger is placed in the image pickup space in the period in which near-infrared light is emitted, the near-infrared light that passes inside the finger enters the image pickup element via the optical system and the aperture as light with which an image of blood vessels is projected. The image of the blood vessels inside the finder is projected on the image pickup face of the image pickup element. Accordingly, in this case, the blood vessels are shown in an image based on an image data item that is generated as an image pickup result by the image pickup section 12.

The memory 13 is configured using, for example, a flash memory, and configured so that data which is specified by the control section 10 is stored in the memory 13 or read from the memory 13.

The interface 14 is configured to transmit/receive various data items to/from an external apparatus connected thereto via a predetermined transmission line.

The notification section 15 includes a display unit 15a and an audio output unit 15b. The display unit 15a displays, on a display screen, characters and graphics based on display data that is supplied from the control section 10. On the other hand, the audio output unit 15b is configured to output, from a speaker, audio based on audio data that is supplied from the control section 10.

(2) Blood Vessel Registration Mode

Next, the blood vessel registration mode will be explained. When the control section 10 determines the blood vessel registration mode as a mode to be executed, the control section 10 changes an operation mode to the blood vessel registration mode, and causes the notification section 15 to issue a notification that it is necessary to place a finger in the image pickup space and to rotate the finger along a finger circumferential face (faces of a finger pulp, finger sides, and a finger dorsum).

In this case, the control section 10 causes the image pickup section 12 to perform an image pickup operation. In addition, the control section 10 causes the near-infrared light source in the image pickup section 12 to blink only in a predetermined blink period every other predetermined interval, thereby causing the near-infrared light source to perform a blink operation.

Figure 4:
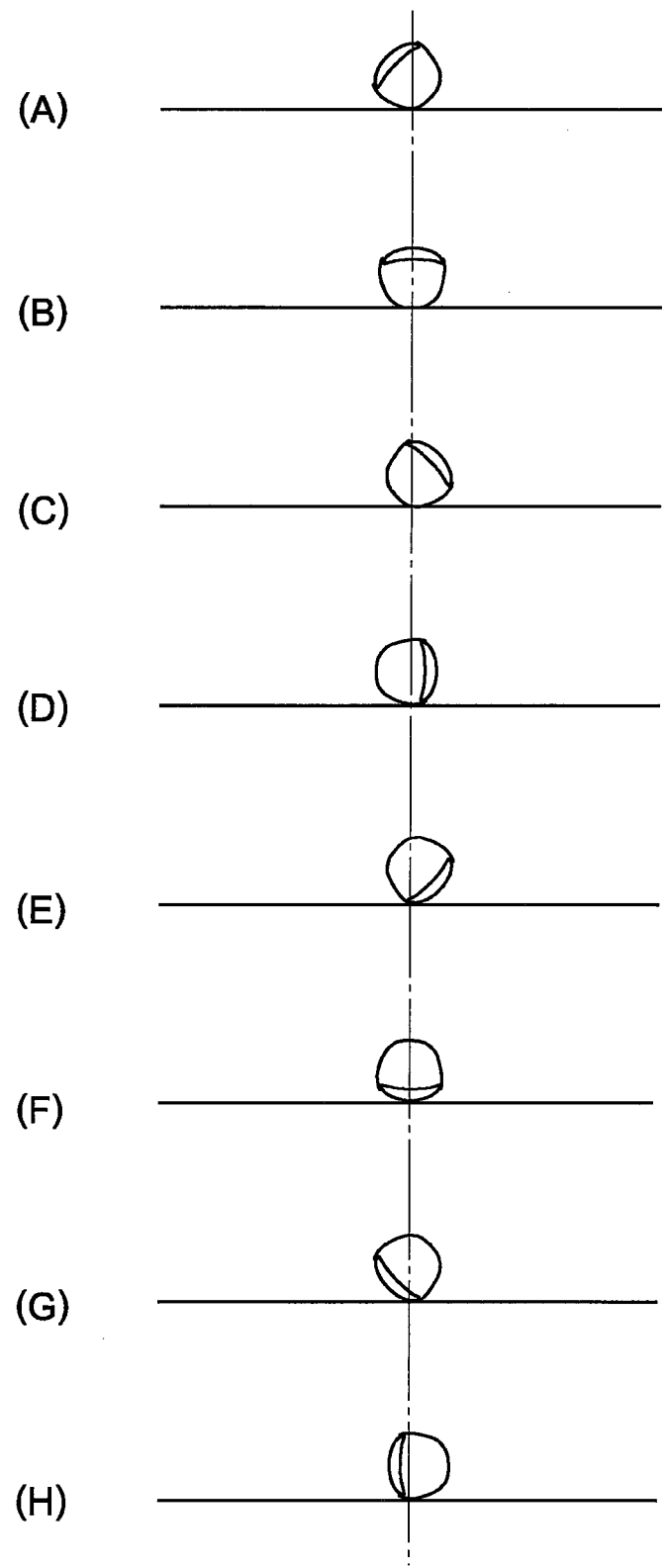
FIG. 4 includes schematic diagrams illustrating transitions of a state of a finger being rotated.
Figure 5:
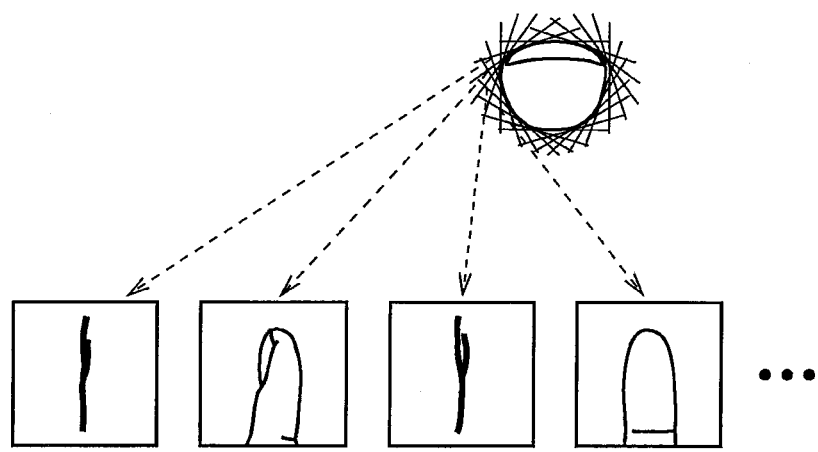
FIG. 5 includes schematic diagrams illustrating relationships between an image pickup target and images.

In this state, when a finger placed in the image pickup space is rotated along the finger circumferential face, for example, as illustrated in FIG. 4, an image of a surface of the finger (hereinafter, this will be referred to as a finger image) and an image of the blood vessels inside the finger (hereinafter, this will be referred to as a blood vessel image) are alternately obtained in accordance with the blink operation of the near-infrared light source in the image pickup section 12, for example, as illustrated in FIG. 5. Note that the finger image is picked up using visible light as image pickup light, and the blood vessel image is picked up using near-infrared light as the image pickup light.

Furthermore, the control section 10 extracts surfaces of a stereoscopic image of the finger (hereinafter, this will be referred to as a finger stereoscopic image) and a stereoscopic image of the blood vessels (hereinafter, this will be referred to as a blood vessel stereoscopic image) from image data items that have been subjected to predetermined image processing and control processing and that are input from the image pickup section 12 in an image pickup order. Then, the control section 10 stores the surfaces of the finger stereoscopic image and the blood vessel stereoscopic image as a data item that is an identification target (hereinafter, this will be referred to as an identification data item) in the memory 13, thereby registering the blood vessels.

In this manner, the control section 10 is configured to be capable of executing the blood vessel registration mode.

(3) Authentication Mode

Next, the authentication mode will be explained. When the control section 10 determines the authentication mode as a mode to be executed, the control section 10 changes the operation mode to the authentication mode, and causes, as in the case of the blood vessel registration mode, the notification section 15 to issue a notification that it is necessary to rotate a finger along a finger circumferential face in the image pickup space. And, the control section 10 causes the image pickup section 12 to perform the image pickup operation, and causes the near-infrared light source to perform the blink operation.

Furthermore, the control section 10 extracts surfaces of a finger stereoscopic image and a blood vessel stereoscopic image from image data items that are input from the image pickup section 12 in an image pickup order as in the case of the blood vessel registration mode. Then, the control section 10 is configured to verify positional relationships between the extracted surfaces and the surfaces that are stored as an identification data item in the memory 13, and configured to determine using a verification result whether or not the finger's owner can be approved as a registrant.

Here, when it is determined that the finger's owner cannot be approved as a registrant, the control section 10 provides a visual and aural notification indicating the disapproval via the display unit 15a and the audio output unit 15b. In contrast, when it is determined that the finger's owner can be approved as a registrant, the control section 10 sends data indicating that the finger's owner has been approved as a registrant to an apparatus that is connected to the interface 14. In this apparatus, a predetermined process, such as closing a door for a certain period or cancelling the operation mode that is a limitation target, that is to be performed when authentication is successful is performed using, as a trigger, the data indicating that the finger's owner has been approved as a registrant.

In this manner, the control section 10 is configured to be capable of executing the authentication mode.

(4) Extraction of Surfaces of Object

Figure 6:
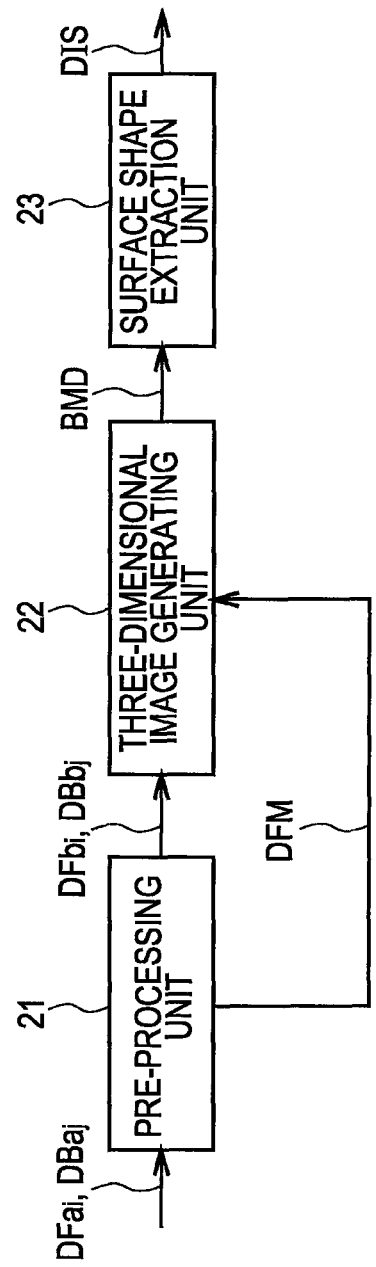
FIG. 6 is a block diagram illustrating a functional configuration of a control section.

Next, a process of extracting surfaces of an object, which is performed by the control section 10, will be specifically explained. In terms of functions, as illustrated in FIG. 6, this process can be divided into a pre-processing unit 21, a three-dimensional image generating unit 22, and a surface shape extraction unit 23. Hereinafter, the pre-processing unit 21, the three-dimensional image generating unit 22, and the surface shape extraction unit 23 will be explained in detail.

(4-1) Process Details Before Generation of Three-Dimensional Image

An image data item $DFa_i$ (i=1, 3, 5, ..., or n (n is an odd number)) concerning a finger image or an image data item $DBa_j$ (j=2, 4, 6, ..., or (n−1)) concerning a blood vessel image, which have been subjected to a process of appropriately decimating image data items so that a finger image and a blood vessel image are alternately obtained on a frame-by-frame basis, is input from the image pickup section 12 to the pre-processing unit 21.

In a first step, the pre-processing unit 21 detects a joint in a finger image based on the image data item $DFa_i$. An example of a detection method will be explained. When the pre-processing unit 21 obtains the image data item $DFa_i$, the pre-processing unit 21 extracts, for example, as illustrated in FIG. 7, on the basis of a contrast in the finger image (part (A) of FIG. 7), a finger region from the finger image (part (B) of FIG. 7).

Furthermore, the pre-processing unit 21 extracts points constituting finger contours (hereinafter, these will be referred to as finger contour points) from the finger region using a contour extracting filter (part (C) of FIG. 7), and extracts finger contour points in a horizontal direction from the finger contour points by extending them using Hough transform or the like (part (D) of FIG. 7).

The pre-processing unit 21 is configured to detect a line segment passing substantially through the centers of the respective extended finger contours as a joint JNL (part (E) of FIG. 7).

Figure 8:
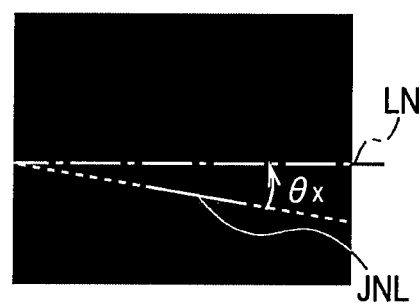
FIG. 8 is a schematic diagram for explaining calculation of a rotation correction amount.

In a second step, the pre-processing unit 21 performs rotation correction, on the basis of a position of the joint, on a finger image that was a target to detect the position of the joint and on a blood vessel image that was input immediately before the finger image. An example of a rotation method will be explained. The pre-processing unit 21 is configured to obtain, as a rotation correction amount of the finger image, an angle θx that is defined by the joint JNL with respect to a line LN in a column direction of the image, for example, as illustrated in FIG. 8, and configured to perform rotation correction on the image in accordance with the rotation correction amount (θx). Note that, although a manner in which rotation correction is performed on the finger image is illustrated as an example in FIG. 8, rotation correction is performed on the blood vessel image in the same manner.

As a result, in this example, a finger image and a blood vessel image that were obtained from each viewpoint are subjected to rotation correction so that the longitudinal direction of the finger which is shown in each of the images will be a row direction of the image. Note that, although a case in which rotation correction is performed so that the angle defined by the column direction of the image and an extension direction of the joint JNL will be 0 [°] is described in this example, it is only necessary that an angle defined by the row or column direction of the image and the extension direction of the joint be a predetermined angle.

In a third step, the pre-processing unit 21 cuts out, on the basis of the position of the joint, regions having a predetermined size from the finger image that was a target to detect the position of the joint and from the blood vessel image that was input immediately before the finger image. Hereinafter, the region that is cut out from the finger image is referred to as a finger partial image, and the region that is cut out from the blood vessel image is referred to as a blood vessel partial image.

Furthermore, when the pre-processing unit 21 cuts out the finger partial image, the pre-processing unit 21 supplies an image data item $DFb_i$ concerning the cut-out finger partial image to the three-dimensional image generating unit 22.

In a fourth step, the pre-processing unit 21 embosses the blood vessels that are shown in the blood vessel partial image using a differential filter such as a Gaussian filter or a Log filter, and converts the blood vessel partial image in which the blood vessels are embossed to a binary image (hereinafter, this will be referred to as a binary blood vessel partial image) on the basis of a brightness value that has been set. Additionally, when the pre-processing unit 21 generates the binary blood vessel partial image, the pre-processing unit 21 supplies an image data item $DBb_j$ concerning the binary blood vessel partial image to the three-dimensional image generating unit 22.

Herein, examples of images before and after embossing is performed are illustrated in FIG. 9. In the blood vessel image before embossing is performed (part (A) of FIG. 9), boundaries between the blood vessels and the other portions are not clear. However, in the blood vessel image after embossing is performed (part (B) of FIG. 9), the boundaries become clear. Also as is clear from FIG. 9, the blood vessels are emphasized using this process, and as a result, the blood vessels and the other portions can be clearly distinguished from each other.

In a fifth step, the pre-processing unit 21 calculates a movement amount of the finger that is shown in the finger partial image which is selected as a process target and in a finger partial image which was input immediately before the selected finger image (which was selected as a process target), and supplies a data item representing the moving amount (hereinafter, this will be referred to as a movement amount data item) $DFM_{1-3}$, $DFM_{3-5}$, $DFM_{5-7}$, . . . , or $DFM_{(n-2)-n}$ to the three-dimensional image generating unit 22.

Similarly, the pre-processing unit 21 calculates a movement amount of the blood vessels that are shown in the blood vessel partial image which is selected as a process target and in a blood vessel partial image which was input immediately before the selected binary blood vessel partial image (which was selected as a process target), and supplies a moving amount data item $DBM_{2-4}$, $DBM_{4-6}$, $DBM_{6-8}$, . . . , $DBM_{(n-3)-(n-1)}$ to the three-dimensional image generating unit 22.

An example of a calculation method will be explained. Regarding explanation of this calculation method, the finger partial image or blood vessel partial image that is selected as a process target is referred to as a current image, and the finger partial image or blood vessel partial image that was input immediately before the above-mentioned finger partial image or blood vessel partial image is referred to as a previous image.

In the pre-processing unit 21, a movement amount is calculated using an optical flow. In other words, the pre-processing unit 21 determines a point that is a focus target (hereinafter, this will be referred to as a focus point) AP in a current image IM1, for example, as illustrated in part (A) of FIG. 10, and recognizes a brightness value of an (m×n)-pixel block (hereinafter, this will be referred to as a focus block) ABL having the focus point AP as a center.

Then, as illustrated in part (B) of FIG. 10, the pre-processing unit 21 searches a previous image IM2 for a block so that a difference between a brightness value of the block and the brightness value of the focus block ABL is minimized, considers the center of a searched block RBL as a point corresponding to the focus point AP (hereinafter, this will be referred to as a corresponding point) XP, and obtains a position vector $V(V_x, V_y)$ to the corresponding point XP with respect to a position AP' corresponding to the focus point AP.

In this manner, the pre-processing unit 21 is configured to search the previous image IM2 for blocks corresponding to a plurality of respective focus blocks in the current image IM1. In addition, the pre-processing unit 21 is configured to calculate the average of respective position vectors between the centers (XP) of the blocks and the positions (AP'), which are the same as positions of the centers of the focus blocks, (the average of vector components $V_x$ in the horizontal direction and the average of vector components $V_y$ in the vertical direction) as a movement amount.

This movement amount is a value that represents not only movement in a horizontal direction (a rotation direction) with respect to a face on which the finger is placed, but also movement in a vertical direction (a direction orthogonal to the rotation direction) with respect to the face, which is caused by fluctuation of a finger pressure amount or a rotation axis, or the like.

Note that a value (a representative value) that is obtained from the respective position vectors using a statistical method, such as the maximum value, the minimum value, or the standard deviation value of the respective position vectors, can be employed as the movement amount instead of the average of the respective position vectors (the average of vector components $V_x$ in the horizontal direction and the average of vector components $V_y$ in the vertical direction).

In the pre-processing unit 21 in this embodiment, not a binary blood vessel partial image but a blood vessel partial image after being subjected to an embossing process and prior to being subjected to binarization is employed as an image that is a target to calculate a movement amount of the blood vessels.

Figure 11:
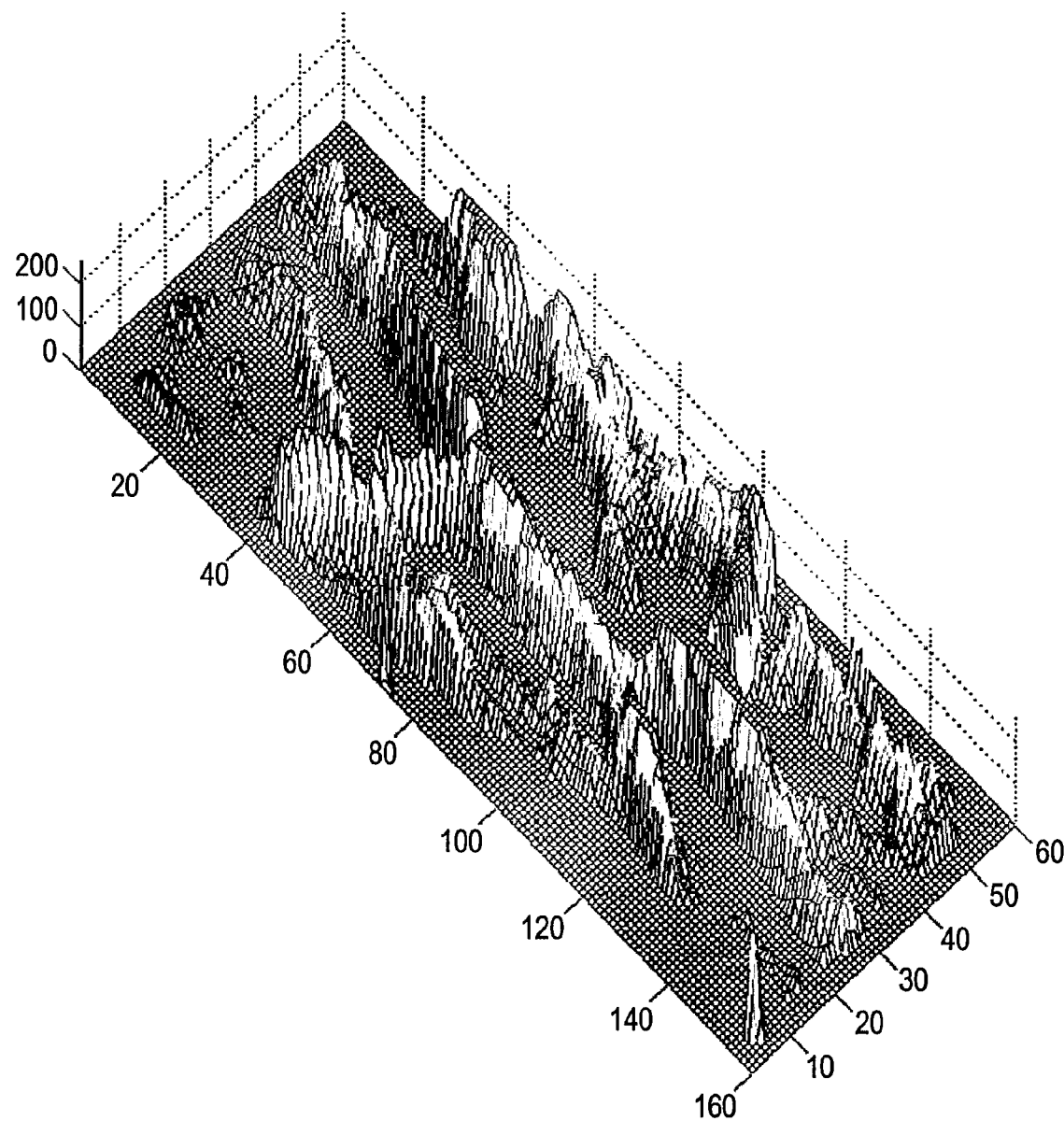
FIG. 11 is a schematic diagram illustrating a state of brightness of a blood vessel image after an embossing process is performed.
Figure 12:
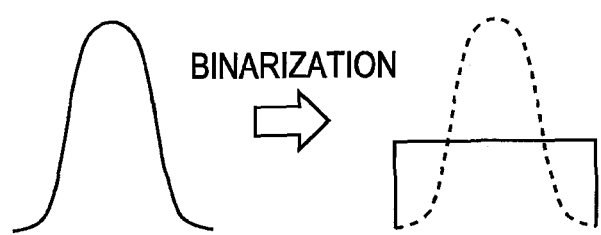
FIG. 12 includes schematic diagrams illustrating transition of a state of brightness through a blood vessel extraction process.
Figure 13:
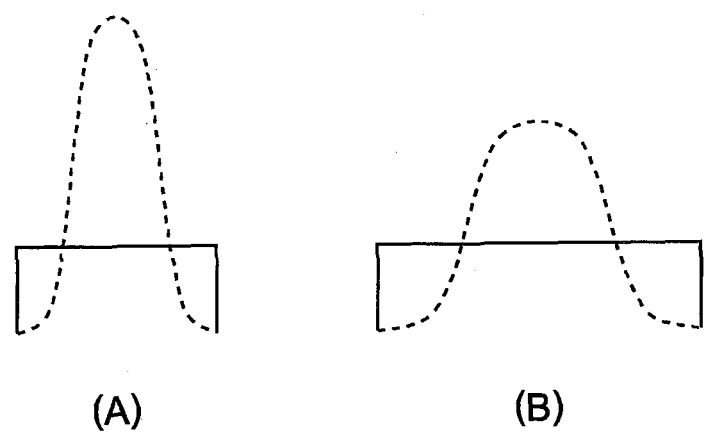
FIG. 13 includes schematic diagrams for explaining equalization of states of brightness.

In the blood vessel partial image prior to being subjected to the embossing process, the blood vessels and the other portions are clearly distinguished from each other as described above with reference to FIG. 9, and the brightness of the blood vessels in the blood vessel image is considered as information indicating a state of an actual cross section as illustrated in FIG. 11. However, this information has been discarded in a case of the blood vessel image (the binary blood vessel image) after being subjected to the blood vessel extraction process as illustrated in FIG. 12. Accordingly, for example, as illustrated in part (A) of FIG. 13 and part (B) of FIG. 11, even when images show cross sections of blood vessels that are different from each other, a probability that the images of the cross sections have the same brightness after the images are subjected to the extraction process increases.

Figure 10:
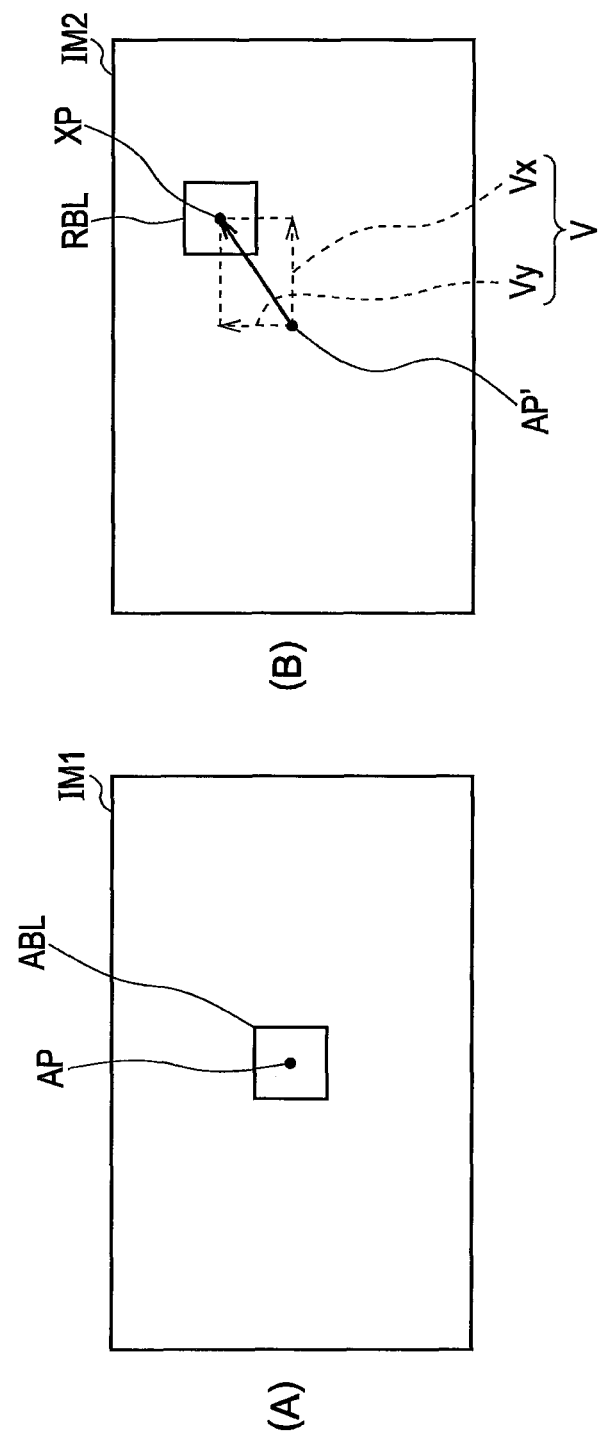
FIG. 10 includes schematic diagrams for explaining calculation of a movement amount.

Accordingly, if the image after being subjected to the blood vessel extraction process (the binary blood vessel image) is employed as an image that is a target to calculate a movement amount, when the previous image IM2 is searched for a block so that a difference between a brightness value of the block and the brightness value of the focus block ABL in the present image IM1 is minimized (part (B) of FIG. 10), a large number of blocks having a brightness value that is equal to or substantially equal to the brightness value of the focus block ABL appear. Thus, the block RBL actually corresponding to the focus block ABL cannot be searched, and as a result, this leads to a situation in which accuracy of calculation of a movement amount is reduced.

For this reason, the blood vessel partial image that is obtained in the course of the blood vessel extraction process (the image after being subjected to the embossing process and prior to being subjected to binarization) is employed as an image that is a target to calculate a movement amount of the blood vessels.

Note that, although, typically, the plurality of focus blocks in the current image IM1 correspond to all pixels of the current image IM1, the plurality of focus blocks in the current image IM1 may correspond to some of portions constituting the finger or blood vessels shown in the current image IM1.

Furthermore, typically, the entire previous image IM2 is considered as a range of the previous image IM2 in which a block is searched so that a difference between a brightness value of the block and the brightness value of the focus block ABL is minimized. However, this range may be a range whose center is placed at a position that is shifted by a movement amount detected in the past and the size of which corresponds to the size of the plurality of focus blocks. The shape of this range may be changed in accordance with a temporal change amount of the movement amount that was detected in the past.

(4-2) Generation of Three-Dimensional Image

Figure 14:
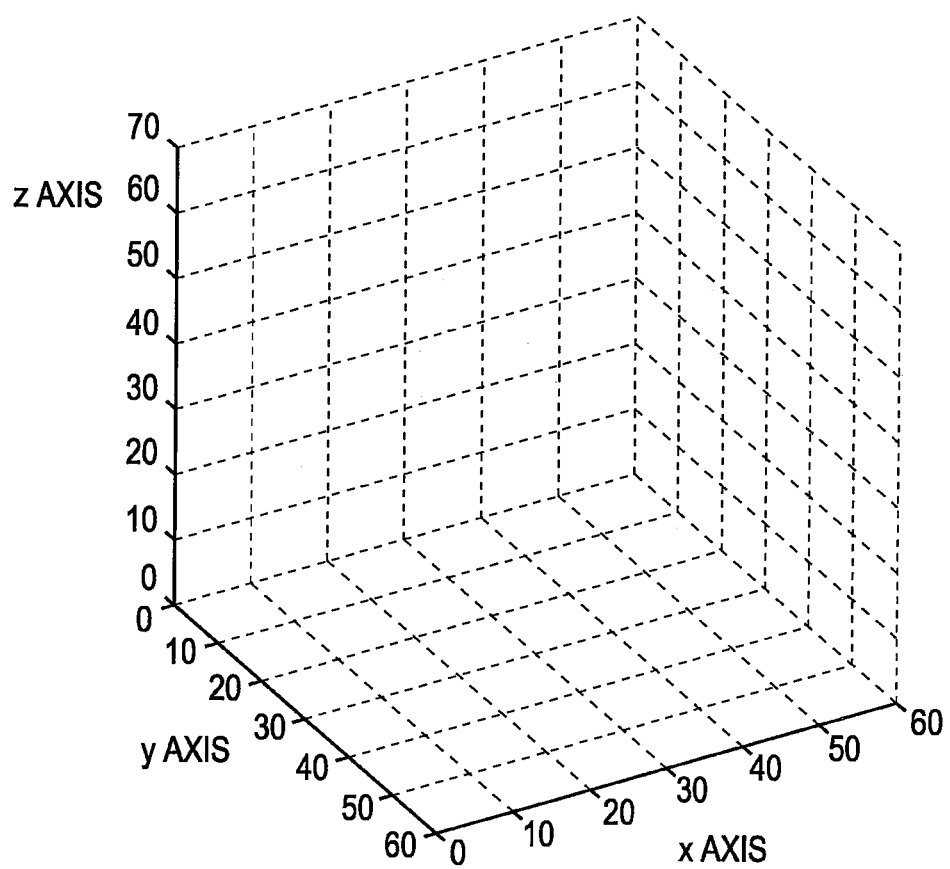
FIG. 14 is a schematic diagram illustrating a voxel space.

As illustrated in FIG. 14, the three-dimensional image generating unit 22 defines a three-dimensional space having a predetermined shape in which a cube that is called a voxel is used as a constitution unit (hereinafter, this will be referred to as a voxel space) as a space that is a projection target.

And, the three-dimensional image generating unit 22 generates, on the basis of the image data items $DFb_i$ ($DFb_1$, $DFb_3$, . . . , $DFb_{(n-2)}$, $DFb_n$) that are input from the pre-processing unit 21, common portions of silhouettes of the finger that is shown in the finger partial images as a finger stereoscopic image (a three-dimensional volume) in the voxel space.

On the other hand, the three-dimensional image generating unit 22 generates, on the basis of the blood vessel image partial data items $DBb_j$ ($DBb_2$, $DBb_4$, . . . , $DBb_{(n-3)}$, $DBb_{(n-1)}$) that are input from the pre-processing unit 21, common portions of silhouettes of the blood vessels that are shown in the binary blood vessel partial images as a blood vessel stereoscopic image (a three-dimensional volume) in the voxel space.

Furthermore, when the three-dimensional image generating unit 22 generates the finger stereoscopic image and the blood vessel stereoscopic image in the defined voxel space, the three-dimensional image generating unit 22 supplies a data item (a voxel data item) that represents the finger stereoscopic image and the blood vessel stereoscopic image in the voxel space as a three-dimensional volume data item BMD to the surface shape extraction unit 23.

An example of a method for generating a finger stereoscopic image that is performed by the three-dimensional image generating unit 22 will be explained. The three-dimensional image generating unit 22 recognizes, in accordance with camera information such as a focal distance and an image center and in accordance with information concerning the voxel space, viewpoints in surroundings of the finger from which the respective finger partial images were picked up. When projection into the voxel space from the respective viewpoints is performed for the finger that is shown in the images, the three-dimensional image generating unit 22 detects respective silhouette regions that are projected into the voxel space.

Figure 15:
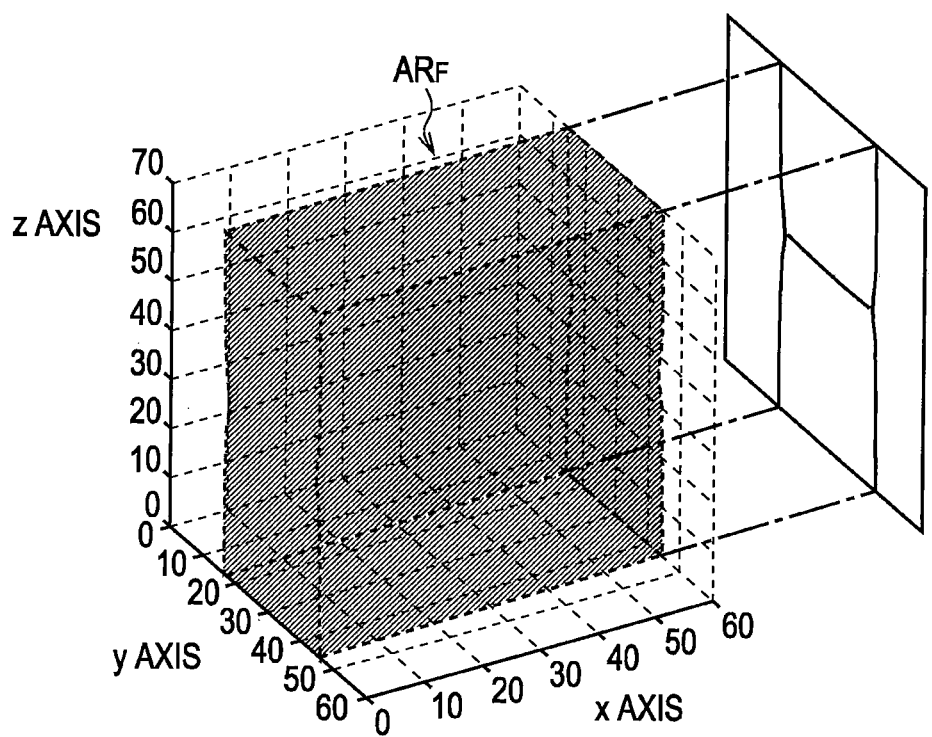
FIG. 15 is a schematic diagram for explaining detection of a silhouette region of a finger.

In other words, when the image data item $DFb_1$ that is first input from the pre-processing unit 21 is considered as a process target, the three-dimensional image generating unit 22 places a finger partial image based on the image data item $DFb_1$ as a reference image at a position corresponding to a viewpoint at which a rotation angle is 0 [°] among the viewpoints in surroundings of the voxel space, for example, as illustrated in FIG. 15, and detects a silhouette region $AR_F$ which is projected in a range from a projection surface of the voxel space to an innermost portion of the voxel space.

Specifically, the respective voxels of the voxel space are reversely projected onto a finger partial image, and projection points are calculated. The voxels whose projection points exist within a contour of the finger shown in the finger partial image are left as voxels of a silhouette region, thereby detecting the silhouette region.

On the other hand, when the image data item $DFb_3$, $DFb_5$, . . . that is input from the pre-processing unit 21 after the first image data item $DFb_1$ is input is considered as a process target, the three-dimensional image generating unit 22 recognizes a movement amount in a rotation direction from the reference image to a finger partial image based on the image data item $DFb_i$ which is considered as the process target, (hereinafter, this will be referred to as a rotation movement amount) on the basis of the movement amount data item DFM that is input from the pre-processing unit 21.

Then, when the rotation movement amount is denoted by $V_{x1}$ and a value that is set as a distance from the rotation axis of the finger to a surface of the finger is denoted by r1, the following equation is obtained.

$$\theta_{ro1} = \arctan(V_{x1}/r1) \quad (1)$$

Using the equation, the three-dimensional image generating unit 22 obtains a rotation angle of the finger partial image that is the current process target with respect to the reference image (hereinafter, this will be referred to as a first rotation angle) $\theta_{ro1}$, and determines whether or not the first rotation angle $\theta_{ro1}$ is less than 360 [°].

When the first rotation angle $\theta_{ro1}$ is less than 360 [°], this indicates a state in which all of view volumes (silhouette regions) for the plurality of finger partial images that were picked up in all of the surroundings of the finger have not been detected yet. In this case, the three-dimensional image generating unit 22 obtains a difference between the first rotation angle $\theta_{ro1}$ and a rotation angle of a finger partial image, for which a view volume was detected immediately before for the current process target, with respect to the reference image (hereinafter, this will be referred to as a second rotation angle), and determines whether the difference is equal to or grater than a predetermined threshold.

When the difference is less than the threshold, this indicates a state in which rotation of the finger is stopped or almost stopped. In this case, the three-dimensional image generating unit 22 does not obtain a silhouette region of the finger partial image that is the current process target, and considers, as a process target, the image data item DFb that is to be input so as to follow the current process target. In this manner, the three-dimensional image generating unit 22 is configured to be capable of preventing calculation of a useless silhouette region in advance.

Figure 16:
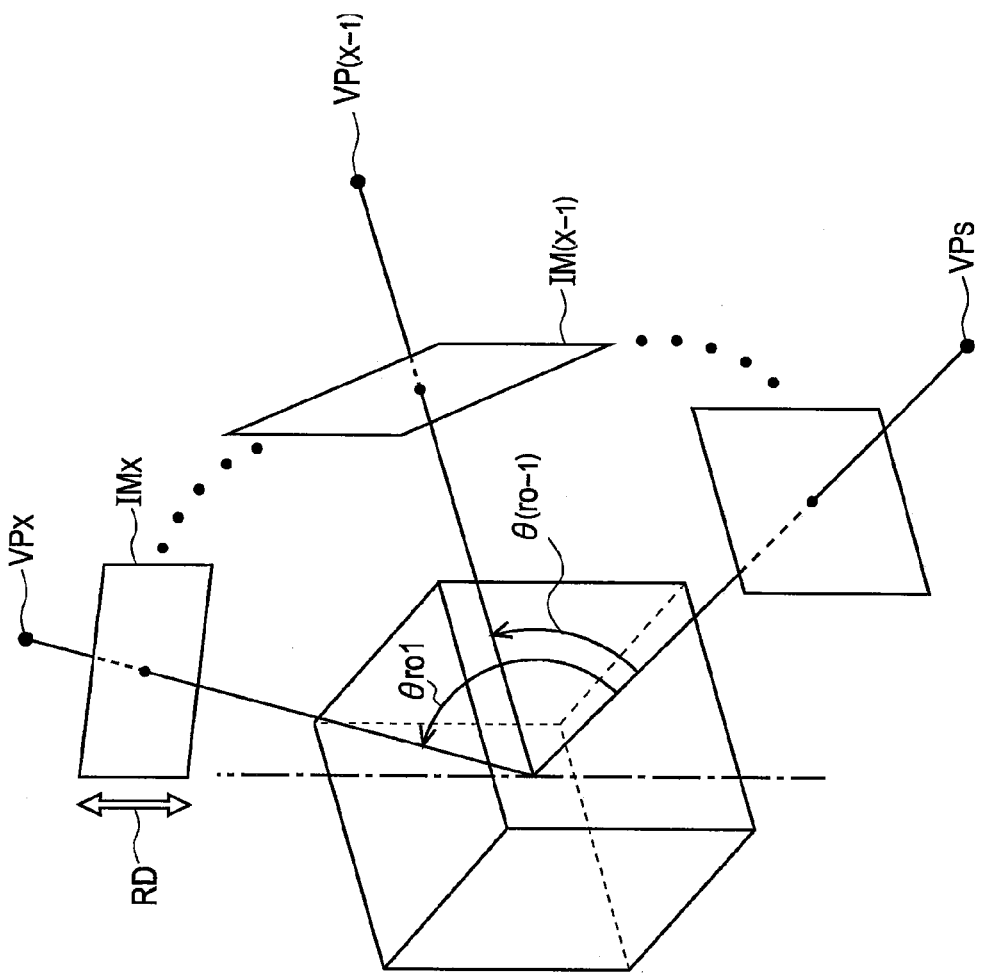
FIG. 16 is a schematic diagram for explaining positional relationships among respective images that are placed in surroundings of the voxel space.

In contrast, when the difference is equal to or greater than the threshold, this indicates a state in which the finger is currently being rotated. In this case, the three-dimensional image generating unit 22 recognizes a viewpoint $VP_X$ that defines the first rotation angle $\theta_{ro1}$ with respect to a viewpoint $VP_S$ for a reference position $IM_S$, for example, as illustrated in FIG. 16, and places a finger partial image $IM_X$ that is the current process target at a position corresponding to the viewpoint $VP_X$.

And, the three-dimensional image generating unit 22 is configured to detect a silhouette region which is projected for the finger partial image $IM_X$ in a range from a projection surface of the projection space to an innermost of the projection space, and, then, configured to consider, as a process target, the image data item DFb that is to be input so as to follow the current target.

Note that, when the three-dimensional image generating unit 22 places the finger image partial $IM_X$ that is the current process target in the surroundings of the voxel space, the three-dimensional image generating unit 22 recognizes, for the finger partial image $IM_X$ and for a finger partial image $IM_{(X-1)}$ for which a view volume was detected immediately before for the finger partial image IM, a movement amount in a direction orthogonal to the rotation direction of the finger (the average of vector components $V_y$ in the vertical direction in the finger image that is the current process target and in the finger image that was last placed) on the basis of the corresponding movement amount data item DFM (FIG. 6), and performs position correction on the viewpoint $VP_X$ by only the movement amount in a correction direction (a direction parallel to the z-axis direction of the voxel space) RD.

Accordingly, even in a case in which fluctuation of the finger pressure amount or the rotation axis, or the like occurs when the finger is rotated, the three-dimensional image generating unit 22 can detect a silhouette region in accordance with the fluctuation. Thus, compared with a case in which the movement amount in the direction orthogonal to the rotation direction of the finger is not considered, the three-dimensional image generating unit 22 is configured to be capable of accurately detecting a silhouette region.

In this manner, the three-dimensional image generating unit 22 detects respective silhouette regions of the finger that is shown in the respective finger partial images which were picked up in the surroundings of the finger until the first rotation angle $\theta_{ro1}$ with respect to the reference image becomes 360 [°] or greater.

Figure 17:
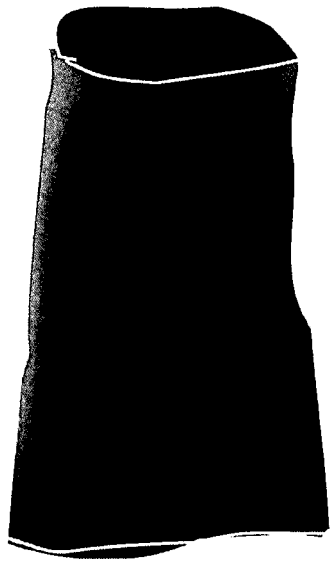
FIG. 17 is a schematic diagram illustrating a finger stereoscopic image.

Furthermore, when the first rotation angle $\theta_{ro1}$ with respect to the reference image becomes 360 [°] or greater, the three-dimensional image generating unit 22 is configured to extract, as a finger stereoscopic image (a three-dimensional volume), common portions of the respective silhouette regions that have been detected so far, thereby generating the finger stereoscopic image, for example, as illustrated in FIG. 17.

Next, an example of a method for generating a blood vessel stereoscopic image that is performed by the three-dimensional image generating unit 22 will be explained. As in the case of the finger stereoscopic image, the three-dimensional image generating unit 22 recognizes, in accordance with the camera information and the information concerning the voxel space, viewpoints in the surroundings of the finger from which the respective binary blood vessel partial images were picked up. When projection into the projection space from the respective viewpoints is performed for the blood vessels that are shown in the images, the three-dimensional image generating unit 22 detects respective silhouette regions that are projected into the projection space.

However, the three-dimensional image generating unit 22 does not detect a silhouette region that is projected in a range from a projection surface of the projection space to an innermost of the projection space. The three-dimensional image generating unit 22 detects a silhouette region of the blood vessels that is projected in a range from the projection surface of the projection space to a projection face that is a defined length distant in a direction toward the innermost of the projection space.

Figure 18:
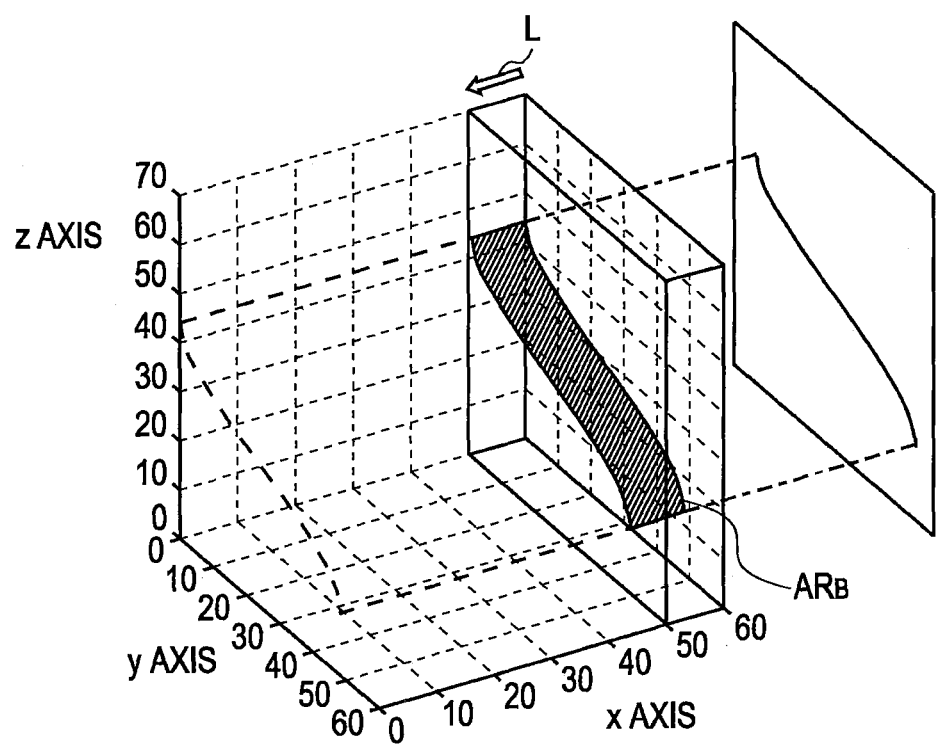
FIG. 18 is a schematic diagram for explaining detection (1) of a silhouette region of blood vessels.

In other words, when the image data item $DBb_2$ that is first input from the pre-processing unit 21 is considered as a process target, the three-dimensional image generating unit 22 places a binary blood vessel partial image based on the image data item $DBb_2$ as a reference image at a position corresponding to a viewpoint at which a rotation angle is 0 [°] among the viewpoints in the surroundings of the voxel space, for example, as illustrated in FIG. 18, and detects only a silhouette region $AR_B$ that is projected into a space (a space bordered with solid lines) ranging from a projection surface of the projection space to a projection face that is a defined length L distant in a direction toward an innermost portion of the projection space. Note that a method for detecting a silhouette region is the same as the method which is performed for a finger image.

On the other hand, when an image data item $DBb_4$, $DBb_6$, . . . that is input from the pre-processing unit 21 after the first image data item $DBb_2$ is input is considered as a process target, the three-dimensional image generating unit 22 recognizes a rotation movement amount from the reference image to a binary blood vessel partial image on the basis of a corresponding movement amount data item DBM that is input from a movement calculation unit 25.

Then, when the rotation movement amount is denoted by $V_{x2}$ and a value that is set as a distance from the rotation axis of the finger to the blood vessels is denoted by r2, the following equation is obtained.

$$\theta_{ro2} = \arctan(V_{x2}/r2) \qquad (2)$$

Using the equation, the three-dimensional image generating unit 22 obtains a first rotation angel $\theta_{ro2}$ of the binary blood vessel partial image with respect to the reference image.

In this manner, the three-dimensional image generating unit 22 detects silhouette regions that are projected into spaces ranging from projection surfaces of the projection space to projection faces which are the defined length L distant in directions toward innermost portions of the projection space, as in the case of the finger stereoscopic image, for the blood vessels which are shown in the binary blood vessel partial images that are process targets until a binary blood vessel partial image with which the first rotation angle $\theta_{ro2}$ becomes 360 [°] or greater is processed as a process target.

Figure 19:
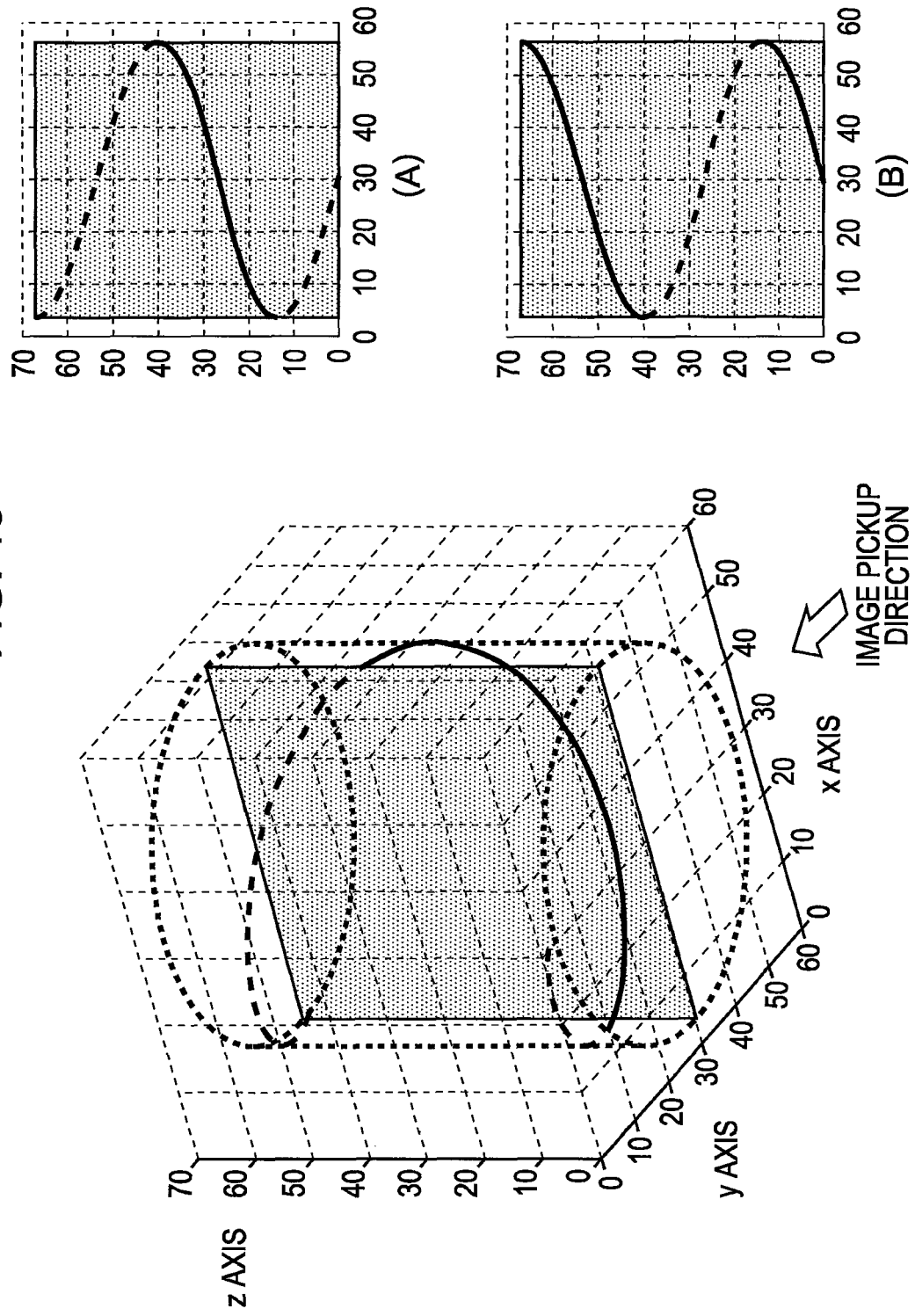
FIG. 19 includes schematic diagrams for explaining relationships between an object and object images that are shown in images (A) at a side in an image pickup direction (a front side of the object) and (B) at a side in a direction opposite to the image pickup direction (a backside of the object).
Figure 20:
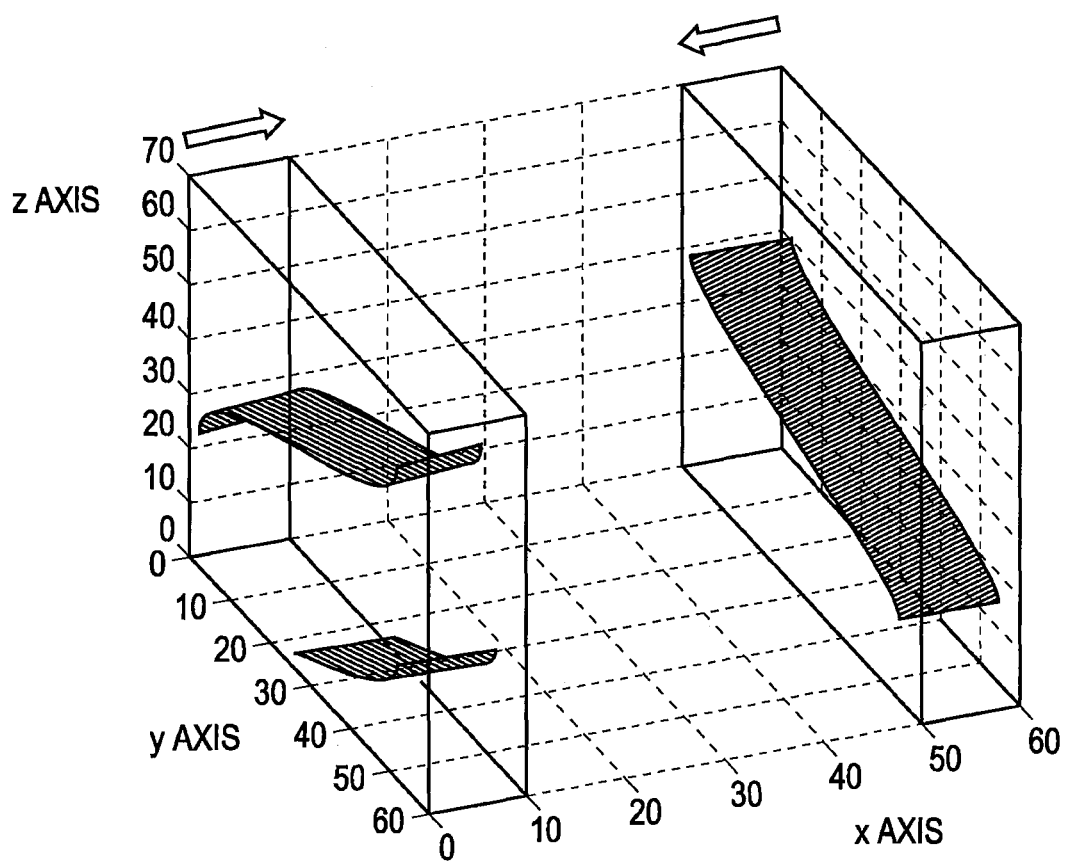
FIG. 20 is a schematic diagram for explaining detection (2) of silhouette regions of the blood vessels.

Here, portions other than blood vessels in a living body are not hollowed, and are blocked with respective tissues such as fat. Accordingly, there is a case in which the optical image pickup section 12 cannot pick up blood vessel portions that exist at a side of the back side of the image pickup surface, for example, as illustrated in FIG. 19. Even in this case, because a target to detect a silhouette region is limited to a region, in which the silhouette region is projected, raining from a projection surface of the voxel space (the projection space) to a projection face which is the defined length distant in a direction toward an innermost portion of the voxel space, voxels of projected portions (silhouette regions) for the object that is shown in the respective images are left in the voxel space as illustrated in FIG. 20.

Figure 21:
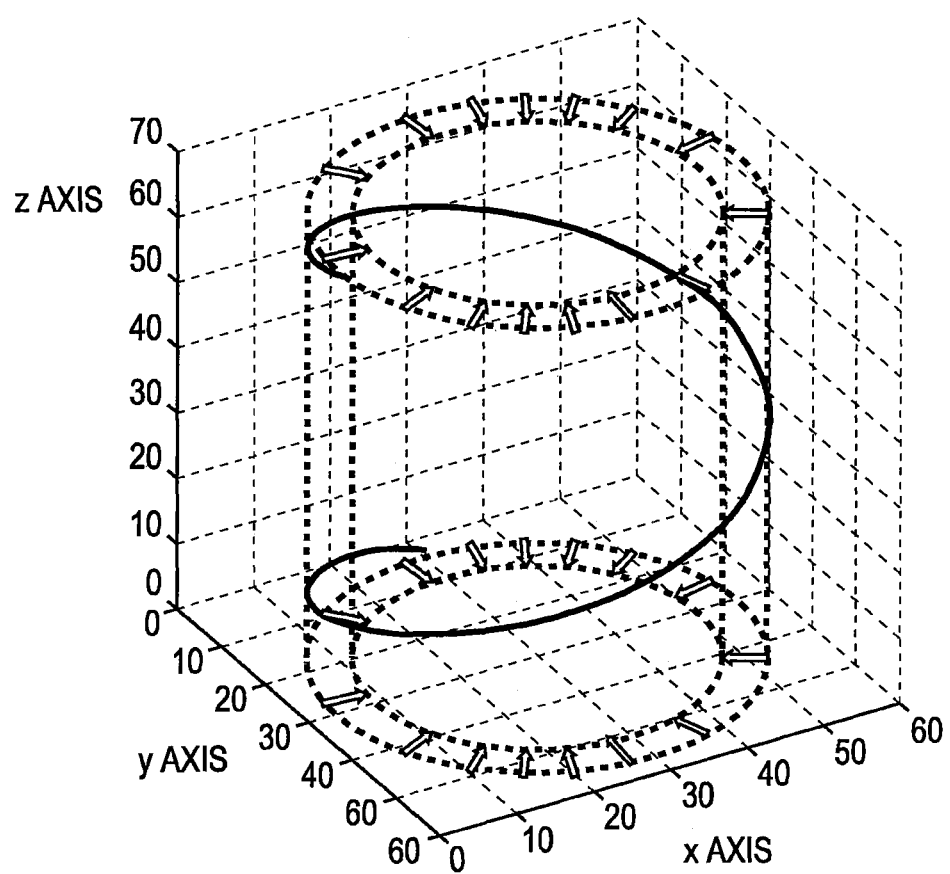
FIG. 21 is a schematic diagram illustrating a state in which silhouette regions of the blood vessels are extracted.

Accordingly, when silhouette regions are detected until the first rotation angle $\theta_{ro2}$ with respect to the reference image becomes 360 [°] or greater, common portions (portions shaded with solid lines) of the voxels that are left as the projected portions (the silhouette regions) for the object which is shown in the respective images are extracted as a blood vessel stereoscopic image (a three-dimensional volume), which is faithfully reproduced for the actual object, in the voxel space, for example, as illustrated in FIG. 21. Note that, in FIG. 21, portions of a cylindrical region are voxels that are left as unprojected portions.

Figure 22:
FIG. 22 is a schematic diagram illustrating a blood vessel stereoscopic image.
Figure 23:
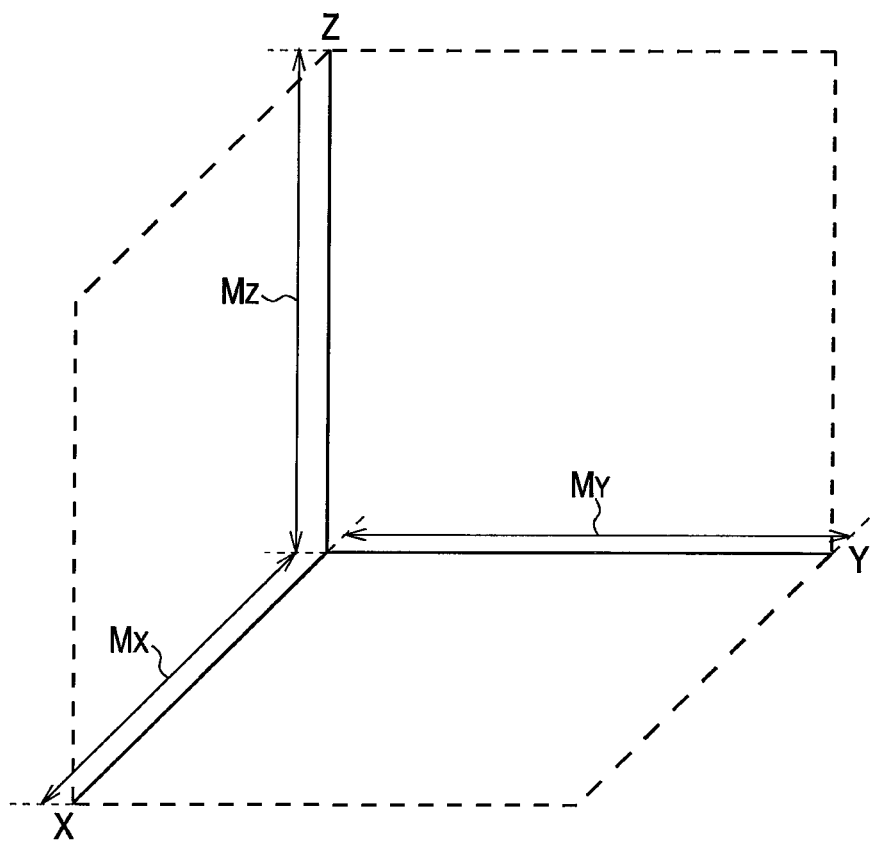
FIG. 23 is a schematic diagram for explaining the length, width, and height of the voxel space.

The three-dimensional image generating unit 22 is configured to, when the first rotation angle $\theta_{ro2}$ with respect to the reference image becomes 360 [°] or greater, extract the common portions of the respective silhouette regions that have been detected as a blood vessel stereoscopic image (a three-dimensional volume), thereby generating the blood vessel stereoscopic image, for example, as illustrated in FIG. 22.

(4-3) Detection of Surfaces of Three-Dimensional Image

When the surface shape extraction unit 23 obtains the three-dimensional volume data item BMD that is input from the three-dimensional image generating unit 22, the surface shape extraction unit 23 extracts respective surfaces of the finger stereoscopic image and the blood vessel stereoscopic image, which are shown in the voxel space (FIG. 14), on the basis of the three-dimensional volume data item BMD, and generates an identification data item DIS as an extraction result. In the blood vessel registration mode, the identification data item DIS is registered in the memory 13, and in the authentication mode, the identification data item DIS is verified against an identification data item that is registered in the memory 13.

An example of an extraction method that is performed by the surface shape extraction unit 23 will be explained. When the surface shape extraction unit 23 detects surfaces of the finger stereoscopic image, the surface shape extraction unit 23 investigates, in units of straight-line rows of voxels (hereinafter, these will be referred to as voxel rows) of the voxel space (FIG. 14) that is defined by the three-dimensional image generating unit 22, whether or not voxels constituting the finger stereoscopic image that is shown in the voxel space (hereinafter, these will be referred to as finger constituting voxels) exist.

Figure 25:
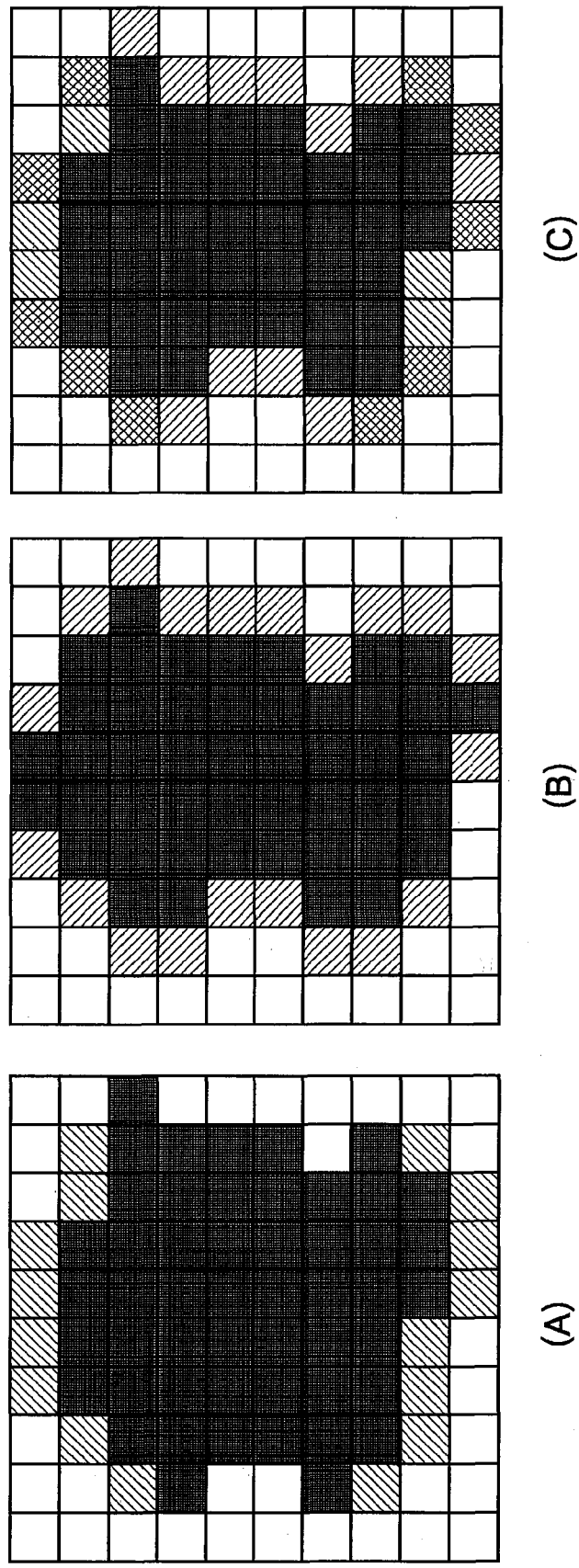

Furthermore, when the surface shape extraction unit 23 investigates whether or not the finger constituting voxels exist in length voxel rows and width voxel rows on one plane, the surface shape extraction unit 23 extracts OR of the finger constituting voxels that exist at ends of the voxel rows (hereinafter, these will be referred to as end voxels) as voxels constituting surfaces of the finger stereoscopic image, for example, as illustrated in FIG. 25.

Similarly, when the surface shape extraction unit 23 detects surfaces of the blood vessel stereoscopic image, the surface shape extraction unit 23 investigates, in units of voxel rows of the voxel space (FIG. 14) that is defined by the three-dimensional image generating unit 22, whether or not voxels constituting the blood vessel stereoscopic image that is shown in the voxel space (hereinafter, these will be referred to as blood vessel constituting voxels) exist. The surface shape extraction unit 23 extracts the blood vessel constituting voxels (end voxels) that exist at ends of the voxel rows as voxels constituting surfaces of the blood vessel stereoscopic image.

In this manner, the surface shape extraction unit 23 ignores the finger constituting voxels or the blood vessel constituting voxels that exist in the middle of the voxels rows, and extracts only the end voxels. Accordingly, as illustrated in FIG. 2, even when the voxels X that do not constitute a three-dimensional volume exist inside the three-dimensional volume (the finger stereoscopic image or the blood vessel stereoscopic image), the surface shape extraction unit 23 can prevent the voxels X, which do not constitute the three-dimensional volume, from being falsely extracted as surfaces of the object.

Here, when even one voxel that does not constitute an object among voxels that are in contact with a voxel which is a consideration target exists, comparison between an extraction accuracy of a typical method in which the voxel that is a consideration target is considered as a voxel of a surface of the object and an extraction accuracy of the extraction method that is performed by the surface shape extraction unit 23 is performed. A simulation result is illustrated in FIG. 26.

Figure 26:
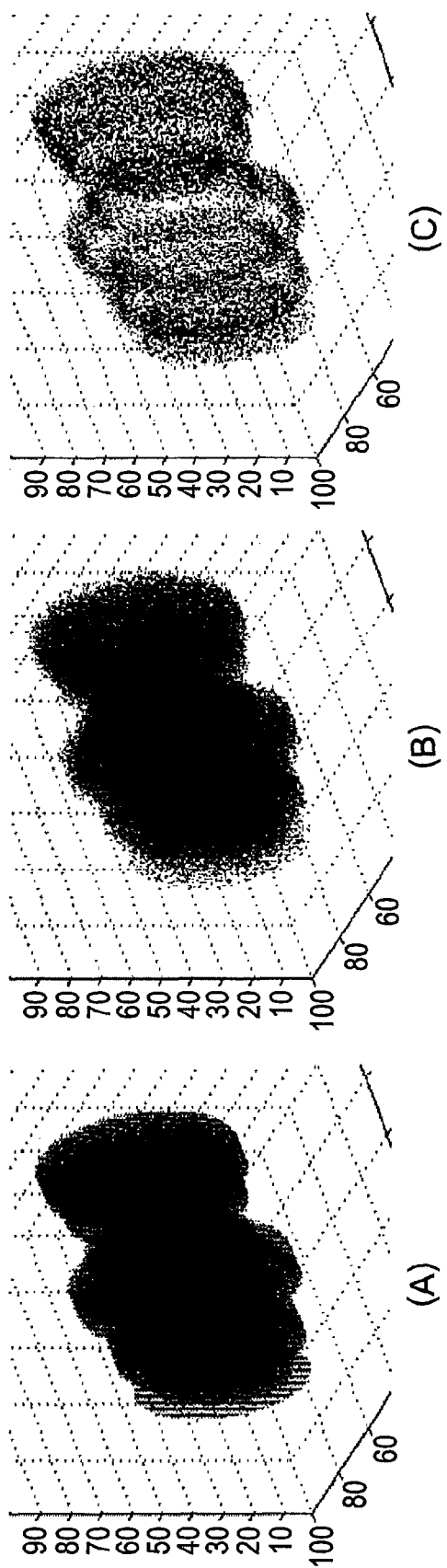
FIG. 26 includes schematic diagrams for explaining comparison of extraction accuracies, which illustrate (A) voxels before extraction is performed, (B) voxels after extraction using typical method is performed, and (C) voxels after extraction using present method is performed.
Figure 27:
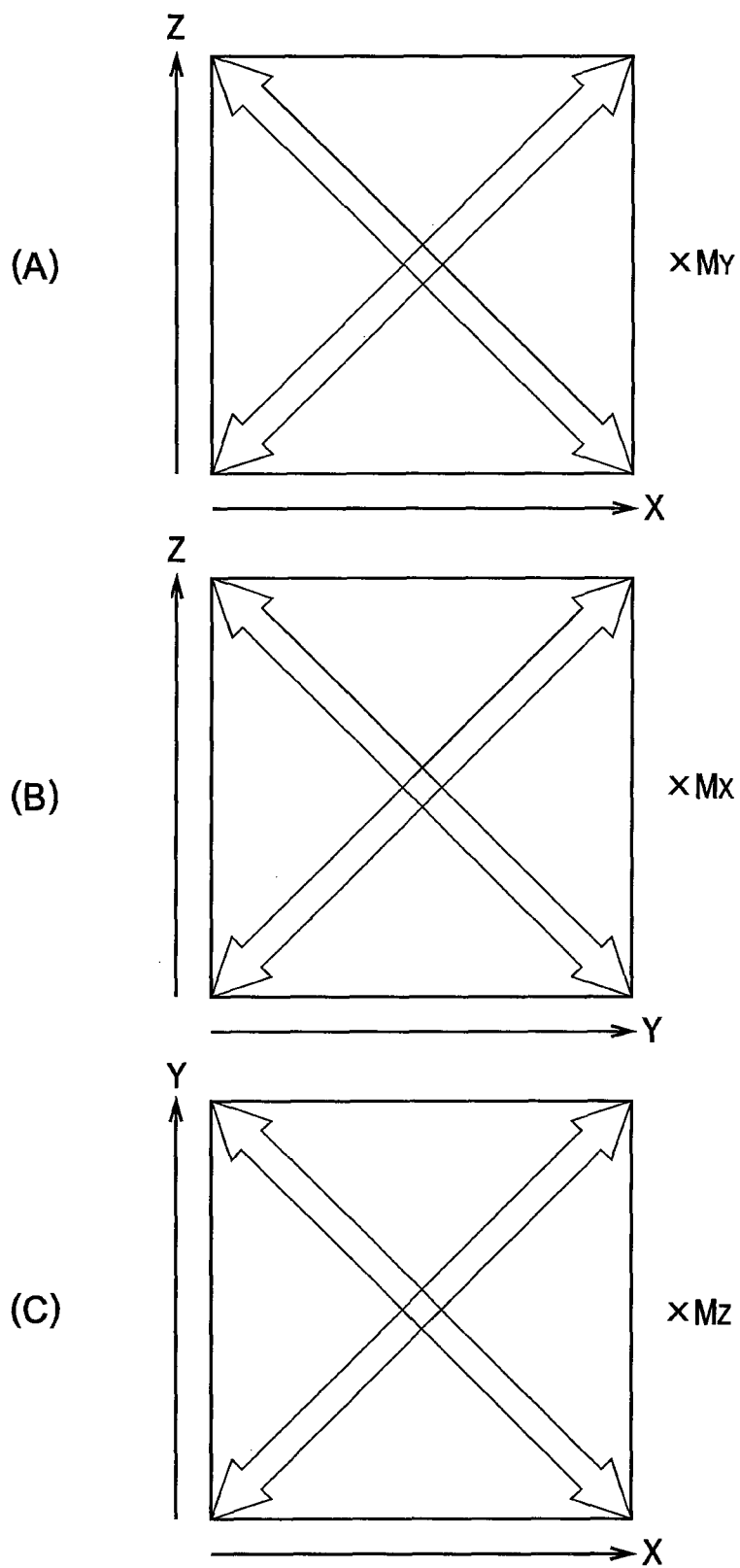
FIG. 27 includes schematic diagrams for explaining voxel rows that are investigation targets in another embodiment.

Part (A) of FIG. 26 is a schematic diagram illustrating respective voxels constituting a certain object after random noise is applied to the voxels. Furthermore, part (B) of FIG. 26 is a schematic diagram illustrating voxels that are extracted from the object illustrated in part (A) of FIG. 26 using the typical method. Part (C) of FIG. 26 is a schematic diagram illustrating voxels that are extracted from the object illustrated in part (A) of FIG. 26 using the extraction method which is performed by the surface shape extraction unit 23.

As is clear from FIG. 26, the extraction accuracy of the extraction method that is performed by the surface shape extraction unit 23 is higher than that of the typical method. Note that the number of voxels which were extracted using the typical method was "82622" and the number of voxels which were extracted using the extraction method that is performed by the surface shape extraction unit 23 was "22482".

Note that, because, in the extraction method that is performed by the surface shape extraction unit 23, the end voxels in the voxel rows are extracted as finger surface voxels or blood vessel surface voxels in units of voxel rows of the voxel space, calculation cost (processing load) can be reduced using the extraction method since the same voxel is not investigated two times or more, compared with the typical method in which the finger surface voxels or blood vessel surface voxels are extracted using relationships between each voxel and voxels that are in contact with the voxel in units of voxels of the voxel space (on a voxel-by-voxel basis).

(5) Operations and Advantages

With the above-described configuration, the surface shape extraction unit 23, which serves as a surface extraction device, investigates, in units of voxel rows of the three-dimensional space (the voxel space (FIG. 14)) that is divided into voxels, whether or not the finger constituting voxels or the blood vessel constituting voxels that are shown in the voxel space exist (FIG. 24), and extracts the end voxels that exist at ends of the voxel rows as voxels constituting surfaces of the object (FIG. 25).

Accordingly, with the surface shape extraction unit 23, intermediate voxels that are sandwiched between the end voxels are ignored, and the end voxels are extracted as voxels of surfaces. Thus, even when a voxel that does not constitute the object exists inside the object, the voxel that does not constitute the object can be prevented from being falsely extracted as a surface of the object without investigation of the same voxel two times or more.

As a result, when even one voxel that does not constitute the object among voxels which are in contact with a voxel that is a consideration target exists, positions of surfaces can be correctly and speedily extracted, compared with the method in which the voxel that is a consideration target is considered as a voxel of a surface of the object.

With the above-described configuration, the finger constituting voxels and the blood vessel constituting voxels that exist at ends of the voxel rows are extracted as voxels of surfaces in units of voxel rows of the voxel space. Accordingly, even when a voxel that does not constitute the object exists inside the object, the voxel that does not constitute the object can be prevented from being falsely extracted as a surface of the object without investigation of the same voxel two times or more. Thus, the accuracy of extraction of surfaces of the object can be improved.

(6) Other Embodiments

In the above-described embodiment, a case is described, in which the surface shape extraction unit 23 serving as a surface extraction device is used as one portion of the process of generating identification information. However, the present invention is not limited to the case. For example, the surface shape extraction unit 23 may be used as one portion of a process of generating a polygon in CG (Computer Graphics).

Note that, in the above-described embodiment, information concerning surfaces of the object that is extracted by the surface shape extraction unit 23 is used as an identification target. However, the information concerning surfaces of the object may be used as intermediate information for an identification target. Examples of such a manner include a manner in which, on the information concerning surfaces of the object, the surface area of a certain cross section in a finger or blood vessel image is calculated, and in which the surface area is used as an identification target.

Figure 24:
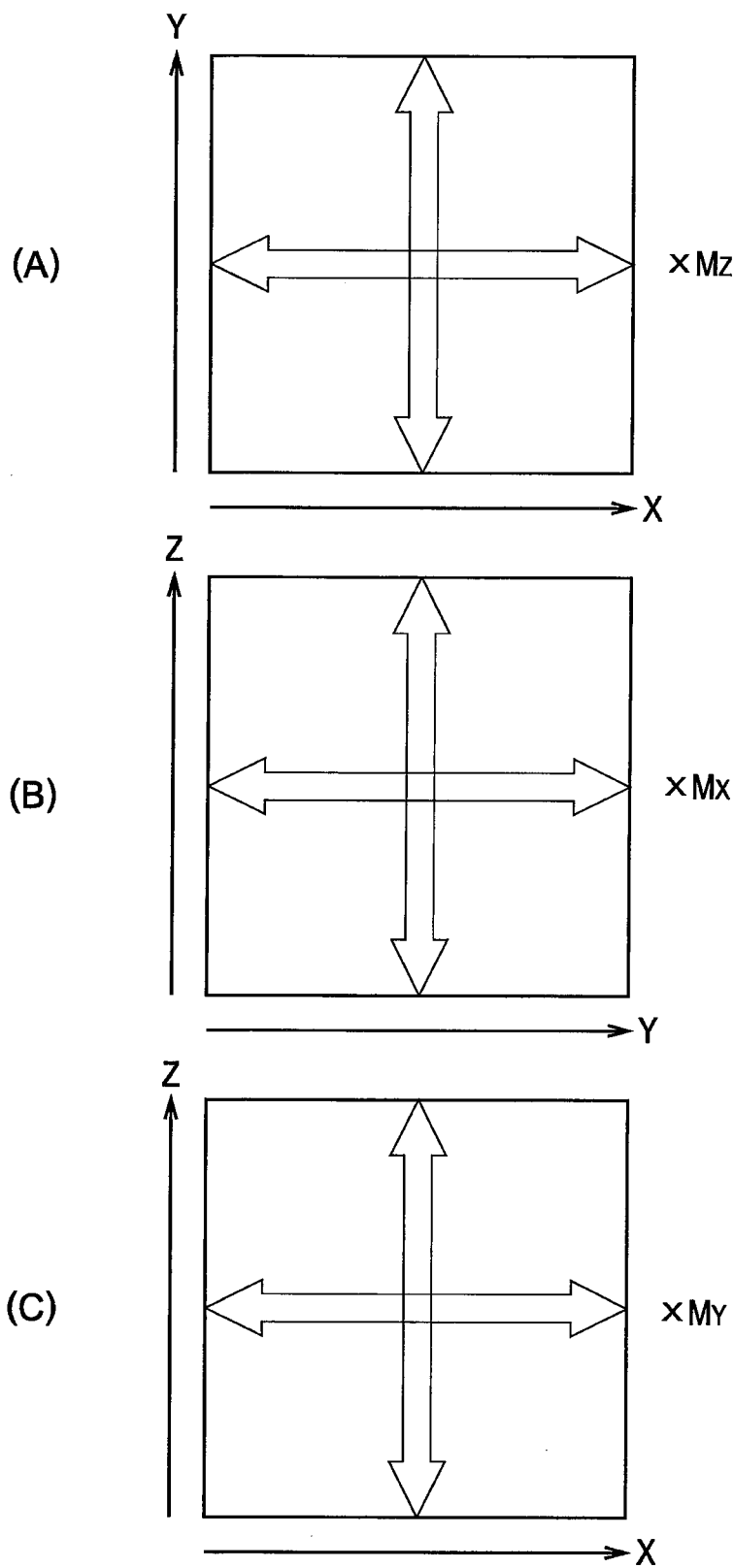
FIG. 24 includes schematic diagrams for explaining voxel rows that are investigation targets.
Figure 28:
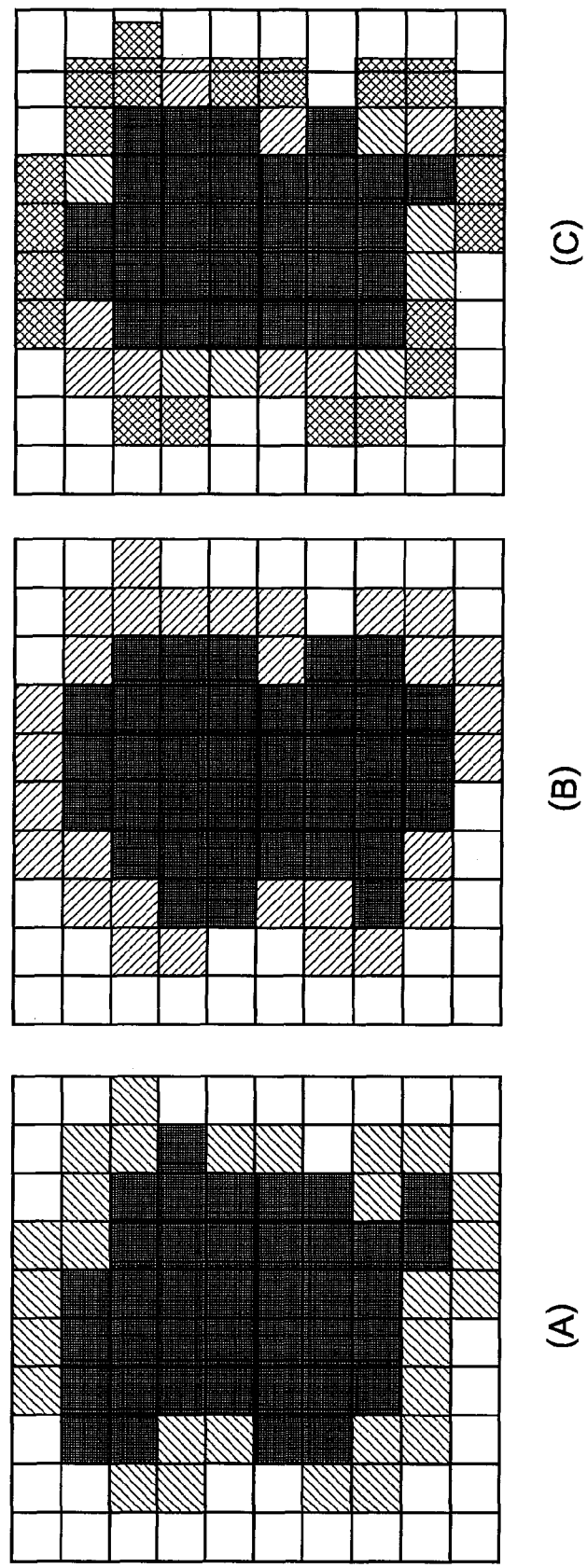

When voxel rows that are investigation targets are set in diagonal directions, as illustrated in FIG. 28, the detection accuracy is slightly reduced as the number of asperities on surfaces of the object increases, compared with a case in which the end voxels in the length voxel rows and width voxel rows are extracted (FIG. 24). However, as in the case of the above-described embodiment, even when a voxel that does not constitute the object exists inside the object, the voxel can be prevented from being falsely extracted as a surface of the object without investigation of the same voxel two times or more.

Furthermore, in the above-described embodiment, a case is described, in which the end voxels are extracted as voxels of surfaces of the object. However, the present invention is not limited to the case. When either of or both of the end voxels are in an isolated state in a voxel row, whether or not the end voxels in the isolated state is noise may be estimated.

Figure 29:
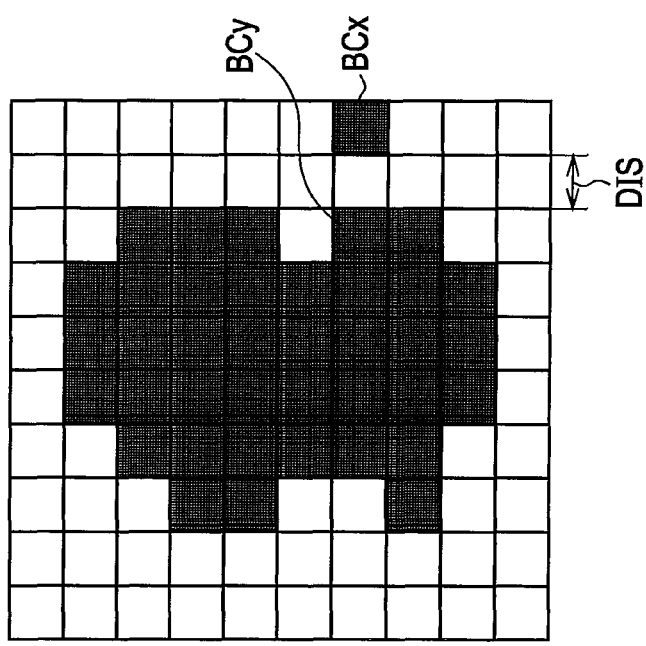
FIG. 29 is a schematic diagram for explaining estimation of whether or not an end voxel is noise.

Specifically, for example, as illustrated in FIG. 29, whether or not a distance DIS between a finger constituting voxel or blood vessel constituting voxel BCy, which is closest to a voxel BCx in the isolated state, and the voxel BCx in the isolated state in a voxel row is shorter than a predetermined threshold is determined.

Here, when the distance DIS is shorter than the predetermined threshold, a voxel between the voxel BCx in the isolated state and the finger constituting voxel or blood vessel constituting voxel BCy, which is closest to the voxel BCx in the isolated state, disappears because of noise or the like. The voxel BCy in the isolated state is not considered as noise, and the voxel BCx in the isolated state is extracted as a voxel constituting a surface of the object.

In contrast, when the distance DIS is equal to or longer than the predetermined threshold, the voxel BCx in the isolated state is considered as noise, and the finger constituting voxel or blood vessel constituting voxel BCy, which is closest to the voxel BCx in the isolated state, is extracted as a voxel constituting a surface of the object.

In this manner, since a voxel constituting a surface of the object is appropriately changed in accordance with estimation of whether or not the end voxel BCx in the isolated state is noise, the extraction accuracy can be markedly improved, compared with a case in which an end voxel is simply extracted as a voxel of a surface of the object.

Furthermore, in the above-described embodiment, a case is described, in which a function of generating the three-dimensional volume data item BMD and a surface extraction function of the surface shape extraction unit 23 are incorporated into the same apparatus (the authentication apparatus 1). However, in another embodiment, the functions may be separated so that each of the functions or some of the functions are incorporated into a single apparatus.

Additionally, in the above-described embodiment, a case is described, in which the above-described surface extraction process is performed in accordance with the programs that are stored in the ROM. However, the present invention is not limited to the case. The above-described surface extraction process may be preformed in accordance with programs that are obtained by being installed from a storage medium in which the programs are stored, such as a CD (Compact Disc), a DVD (Digital Versatile Disc), or a semiconductor memory, or by being downloaded from a server which supplies the programs on the Internet.

Moreover, in the above-described embodiment, a case is described, in which the control section 10 performs the surface extraction process. However, the present invention is not limited to the case. One portion of or all of the process may be performed by a graphics workstation (an image processor).

In addition, in the above-described embodiment, a case is described, in which the authentication apparatus 1 having an image pickup function, a verification function, and a registration function is applied. However, the present invention is not limited to the case. In another embodiment, the functions may be separated in accordance with applications so that each of the functions or some of the functions are incorporated into a single apparatus.

INDUSTRIAL APPLICABILITY

The present invention can be utilized in the field of biometrics authentication.

The invention claimed is:
1. A surface extraction method comprising:
a first step of investigating, in a three-dimensional space that is divided into regions having a lattice shape, in units of straight-line rows of the regions, whether or not constituting regions that constitute an object which is shown in the three-dimensional space exist; and a second step of extracting, as surfaces of the object, the constituting regions that exist at ends of a straight-line row and ignoring one or more regions between the end regions, wherein in the first step, when a length, width, and height of the three-dimensional space that is occupied by the object are denoted by "$M_X$", "$M_Y$", and "$M_Z$", straight-line rows in a length direction and a width direction on $M_Z$ X-Y planes, $M_X$ Y-Z planes, and $M_Y$ Z-X planes are investigated.

2. A surface extraction method comprising:

a first step of investigating, in a three-dimensional space that is divided into regions having a lattice shape, in units of straight-line rows of the regions, whether or not constituting regions that constitute an object which is shown in the three-dimensional space exist; and a second step of extracting, as surfaces of the object, the constituting regions that exist at ends of a straight-line row and ignoring one or more regions between the end regions, wherein in the second step, when either of or both of the constituting regions that exist at ends of a straight-line row are in an isolated state, in a case in which distances between the constituting regions in the isolated state and constituting regions that are closest to the constituting regions in the isolated state in the straight-line row are equal to or longer than a predetermined threshold, the constituting regions that are closest to the constituting regions in the isolated state are extracted as surfaces of the object.

3. A surface extraction device comprising:

a work memory; and an image processing section that performs image processing with the work memory, wherein the image processing section performs:

investigating, in a three-dimensional space that is divided into regions having a lattice shape, in units of straight-line rows of the regions, whether or not constituting regions that constitute an object which is shown in the three-dimensional space exist, wherein when a length, width, and height of the three-dimensional space that is occupied by the object are denoted by "$M_X$", "$M_Y$", and "$M_Z$", straight-line rows in a length direction and a width direction on $M_Z$ X-Y planes, $M_X$ Y-Z planes, and $M_Y$ Z-X planes are investigated, and extracting, as surfaces of the object, the constituting regions that exist at ends of a straight-line row and ignoring one or more regions between the end regions.

4. A non-transitory computer-readable memory storing a program which, when executed by a control section, causes the control section to perform:

investigating, in a three-dimensional space that is divided into regions having a lattice shape, in units of straight-line rows of the regions, whether or not constituting regions that constitute an object which is shown in the three-dimensional space exist, wherein when a length, width, and height of the three-dimensional space that is occupied by the object are denoted by "$M_X$", "$M_Y$", and "$M_Z$", straight-line rows in a length direction and a width direction on $M_Z$ X-Y planes, $M_X$ Y-Z planes, and $M_Y$ Z-X planes are investigated; and extracting, as surfaces of the object, the constituting regions that exist at ends of a straight-line row and ignoring one or more regions between the end regions.

5. The method according to claim 1, further comprising:

forming the three-dimensional space by projecting a plurality of two-dimensional images.

6. The method according to claim 5, wherein the two-dimensional images are based on a first set of two-dimensional images taken from different perspectives of the object.

7. The method according to claim 6, further comprising:

detecting contours of the object in the first set of two-dimensional images;

rotating the first set of two-dimensional images based on the detected contours of the object; and cutting the rotated first set of two-dimensional images in a predetermined size.

8. The method according to claim 5, wherein the two-dimensional images are binarized.

9. A surface extraction device comprising:

a work memory; and an image processing section that performs image processing with the work memory, wherein the image processing section performs:

investigating, in a three-dimensional space that is divided into regions having a lattice shape, in units of straight-line rows of the regions, whether or not constituting regions that constitute an object which is shown in the three-dimensional space exist, and extracting, as surfaces of the object, the constituting regions that exist at ends of a straight-line row and ignoring one or more regions between the end regions, wherein when either of or both of the constituting regions that exist at ends of a straight-line row are in an isolated state, in a case in which distances between the constituting regions in the isolated state and constituting regions that are closest to the constituting regions in the isolated state in the straight-line row are equal to or longer than a predetermined threshold, the constituting regions that are closest to the constituting regions in the isolated state are extracted as surfaces of the object.

10. A non-transitory computer-readable memory storing a program which, when executed by a control section, causes the control section to perform:

investigating, in a three-dimensional space that is divided into regions having a lattice shape, in units of straight-line rows of the regions, whether or not constituting regions that constitute an object which is shown in the three-dimensional space exist; and extracting, as surfaces of the object, the constituting regions that exist at ends of a straight-line row and ignoring one or more regions between the end regions, wherein when either of or both of the constituting regions that exist at ends of a straight-line row are in an isolated state, in a case in which distances between the constituting regions in the isolated state and constituting regions that are closest to the constituting regions in the isolated state in the straight-line row are equal to or longer than a predetermined threshold, the constituting regions that are closest to the constituting regions in the isolated state are extracted as surfaces of the object.

11. The method according to claim 2, further comprising:

forming the three-dimensional space by projecting a plurality of two-dimensional images.

12. The method according to claim 11, wherein the two-dimensional images are based on a first set of two-dimensional images taken from different perspectives of the object.

13. The method according to claim 12, further comprising:

detecting contours of the object in the first set of two-dimensional images;

rotating the first set of two-dimensional images based on the detected contours of the object; and cutting the rotated first set of two-dimensional images in a predetermined size.

14. The method according to claim 11, wherein the two-dimensional images are binarized.

15. The surface extraction device according to claim 3, wherein the image processing section further performs forming the three-dimensional space by projecting a plurality of two-dimensional images.

16. The surface extraction device according to claim 15, wherein the two-dimensional images are based on a first set of two-dimensional images taken from different perspectives of the object.

17. The surface extraction device according to claim 16, wherein the image processing section further performs:
- detecting contours of the object in the first set of two-dimensional images;
- rotating the first set of two-dimensional images based on the detected contours of the object; and
- cutting the rotated first set of two-dimensional images in a predetermined size.

18. The surface extraction device according to claim 15, wherein the two-dimensional images are binarized.

19. The surface extraction device according to claim 9, wherein the image processing section further performs forming the three-dimensional space by projecting a plurality of two-dimensional images.

20. The surface extraction device according to claim 19, wherein the two-dimensional images are based on a first set of two-dimensional images taken from different perspectives of the object.

21. The surface extraction device according to claim 20, wherein the image processing section further performs:
- detecting contours of the object in the first set of two-dimensional images;
- rotating the first set of two-dimensional images based on the detected contours of the object; and
- cutting the rotated first set of two-dimensional images in a predetermined size.

22. The surface extraction device according to claim 19, wherein the two-dimensional images are binarized.

* * * * *